United States Patent [19]

Smyth

[11] 4,361,060
[45] Nov. 30, 1982

[54] MECHANICAL AUTOMATIC TRANSMISSION

[76] Inventor: Robert R. Smyth, Morningside La., Lincoln, Mass. 01773

[21] Appl. No.: 190,512

[22] Filed: Sep. 25, 1980

Related U.S. Application Data

[63] Continuation of Ser. No. 869,242, Jan. 24, 1978, abandoned.

[51] Int. Cl.³ .................... B60K 41/08; B60K 41/28
[52] U.S. Cl. ............................ 74/866; 74/752 A; 192/0.092
[58] Field of Search .............. 74/855, 860, 866, 867, 74/872, 878, 752 A, 752 C, 752 D, DIG. 7; 192/0.032, 0.033, 0.076, 0.08, 0.092, 0.073, 0.09, 3.58, 103 R

[56] References Cited

U.S. PATENT DOCUMENTS

| | | | |
|---|---|---|---|
| 2,144,074 | 1/1939 | Maybach | 192/0.01 |
| 2,163,903 | 6/1939 | Whittington | 192/0.01 |
| 2,933,944 | 4/1960 | Carnagua | 74/DIG. 7 |
| 3,182,778 | 5/1965 | Droschel | 192/0.092 |
| 3,402,793 | 9/1968 | Scholl | 192/0.033 |
| 3,478,851 | 11/1969 | Smyth et al. | 192/3.55 |
| 3,536,176 | 10/1970 | Cappa | 192/0.044 |
| 3,548,980 | 12/1970 | Schmidt | 192/0.09 |
| 3,640,156 | 2/1972 | Mori et al. | 74/866 |
| 3,648,642 | 12/1971 | Ravenel | 192/73 |
| 3,702,572 | 11/1972 | Wakamatsu et al. | 74/866 |
| 3,756,358 | 9/1973 | Espenschied et al. | 192/0.09 |
| 3,776,048 | 12/1973 | Enomoto et al. | 74/866 |
| 3,834,499 | 9/1974 | Candellero | 192/0.09 |
| 3,881,368 | 5/1975 | Furuhashi et al. | 74/866 |
| 3,903,759 | 9/1975 | Hashimoto et al. | 74/866 |
| 3,937,105 | 2/1976 | Arai | 74/866 |
| 3,942,393 | 3/1976 | Forster et al. | 74/866 |
| 3,961,546 | 6/1976 | Gilmore et al. | 76/866 |
| 3,974,720 | 8/1976 | Iijima | 74/866 |
| 4,023,443 | 5/1977 | Usui et al. | 74/866 |
| 4,038,889 | 8/1977 | Lindow et al. | 74/866 |
| 4,039,061 | 8/1977 | Pruvot et al. | 192/4 |
| 4,044,634 | 8/1977 | Florus et al. | 74/866 |
| 4,081,065 | 3/1978 | Smyth et al. | 192/0.076 |
| 4,106,368 | 8/1978 | Ivey | 74/866 |
| 4,109,772 | 8/1978 | Poore | 192/0.092 |
| 4,140,031 | 2/1979 | Sibeud et al. | 74/866 |
| 4,194,608 | 3/1980 | Usui et al. | 192/0.092 |
| 4,198,882 | 4/1980 | Kiencke et al. | 74/866 |
| 4,208,929 | 6/1980 | Heino et al. | 74/731 |

FOREIGN PATENT DOCUMENTS

| | | | |
|---|---|---|---|
| 693406 | 9/1964 | Canada | 340/74 |
| 950995 | 7/1974 | Canada | 341/68 |
| 967268 | 5/1975 | Canada | 341/68 |
| 1644196 | of 0000 | Japan . | |
| 496947 | 6/1937 | United Kingdom . | |
| 507864 | 2/1938 | United Kingdom . | |
| 854969 | 12/1956 | United Kingdom . | |
| 851996 | 1/1957 | United Kingdom . | |
| 868229 | 12/1958 | United Kingdom . | |
| 877114 | 1/1959 | United Kingdom . | |
| 976826 | 11/1962 | United Kingdom . | |
| 1062253 | 11/1963 | United Kingdom . | |
| 1158800 | 11/1967 | United Kingdom . | |
| 1369983 | 9/1970 | United Kingdom . | |
| 1368580 | 9/1972 | United Kingdom . | |
| 1519982 | 7/1975 | United Kingdom . | |

*Primary Examiner*—George H. Krizmanich
*Attorney, Agent, or Firm*—Lahive & Cockfield

[57] ABSTRACT

An electro-mechanical automatic transmission system for use in motor vehicles. The automatic transmission comprises a mechanical transmission, gear synchronizer and clutch which have been automated by the addition of electro-mechanical and pneumatic operators and an analog and digital electronic control system. The electronic control system receives operator commands regarding the mode of transmission operation (either automatic or manual) and monitors throttle position, engine speed, transmission countershaft speed, drive shaft (vehicle) speed, and rates of change of these speeds. It also receives information of the present gear ratio and stores data indicating the direction of the last shift. By utilizing this information, the electronic control system selects the optimum transmission gear ratio, effects synchronization of the selected transmission gear elements and controls clutch engagement according to a logic program.

65 Claims, 11 Drawing Figures

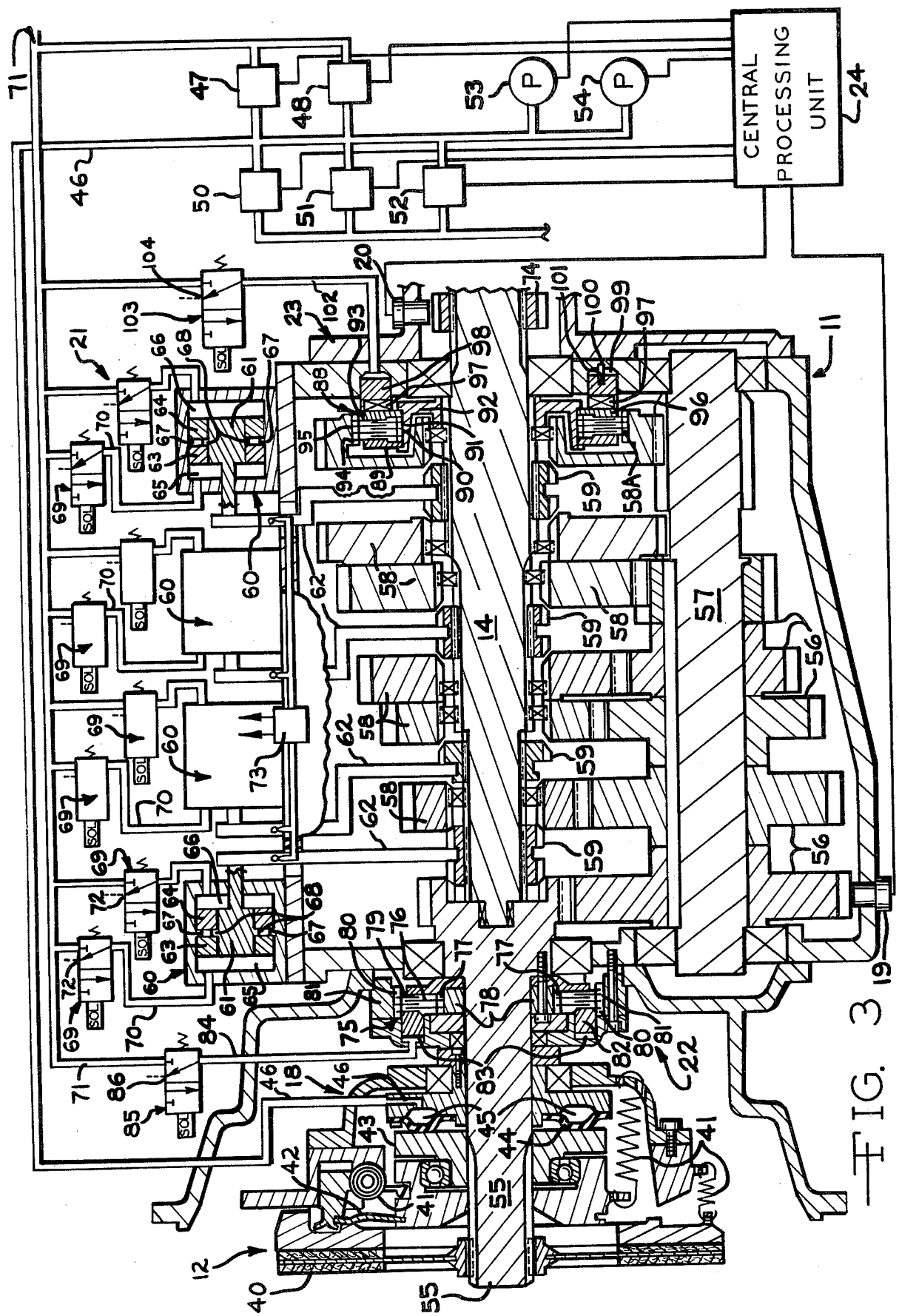

| DRIVER SHIFT CONTROL ||||||
|---|---|---|---|---|---|
| SIGNAL IN | LOGIC CODE | FROM | SIGNAL OUT | LOGIC CODE | TO |
| | | | Auto | AUTO | Gear Counter |
| | | | Manual | MAN | Gear Counter |
| | | | Up | MUP | Gear Counter |
| | | | Down | MDN | Gear Counter |
| | | | Neutral | NEUT | Gear Counter |
| | | | Reverse | REV | Gear Counter |

| SPEED AND SYNCHRONIZER CIRCUIT ||||||
|---|---|---|---|---|---|
| SIGNAL IN | LOGIC CODE | FROM | SIGNAL OUT | LOGIC CODE | TO |
| Output Shaft | — | Pickup | Calculated Engine Speed | GOS | Shift Initiate |
| Input Shaft | — | Pickup | Calculated Engine Overspeed | O | Gear Counter |
| Engine | — | Pickup | Vehicle Underspeed | U | Clutch Control Command Logic Gear Counter |
| Synchronizer Enable | SE | Command Logic | Output Shaft Speed | OS | Shift Initiate |
| | | | Synchronizer Brake Drive | SB | Synchronizer Brake Assembly |
| | | | Error | E | Command Logic |
| | | | Synchronizer Clutch Drive | SC | Synchronizer Accelerator Assembly |
| | | | Engine High | EH | Clutch Control + Command Logic |
| | | | Engine Low | EL | Clutch Control |
| | | | Engine Speed | ES | Clutch Control |

| GEAR COUNTER CIRCUIT ||||||
|---|---|---|---|---|---|
| SIGNAL IN | LOGIC CODE | FROM | SIGNAL OUT | LOGIC CODE | TO |
| Auto Up | AU | Shift Initiate | Gear Count | GCN | Command Logic Clutch Control |
| Up Limit | UL | Shift Initiate | Alarm | ALARM | Audible Alarm |
| Auto Down | AD | Shift Initiate | Last Up | LU | Shift Initiate |
| Down Enable | DE | Shift Initiate | Last Down | LD | Shift Initiate |
| Neutral | GN | Neutral Switch | | | |
| Hold | | Failure Circuit | | | |
| Calculated Engine Overspeed | O | Speed Circuit | | | |
| Vehicle Underspeed | U | Speed Circuit | | | |
| Throttle Switch | TS | Throttle Assembly | | | |
| Ride Through Switch | RTD | Throttle Assembly | | | |
| Brake On | BS | Brake Switch | | | |
| Ignition On | IGN | Ignition Switch | | | |
| Shift Reset | SR | Shift Initiate | | | |
| Auto | AUTO | Driver Control | | | |
| Manual | MAN | Driver Control | | | |
| Up | MUP | Driver Control | | | |
| Down | MDN | Driver Control | | | |
| Neutral | NEUT | Driver Control | | | |
| Reverse | REV | Driver Control | | | |

FIG. 4

COMMAND LOGIC CIRCUIT 114

| SIGNAL IN | LOGIC CODE | FROM | SIGNAL OUT | LOGIC CODE | TO |
|---|---|---|---|---|---|
| Gear Count | GNC | Gear Counter | Shift Solenoid | M1 to M6+MR | Transmission Operator |
| Error | E | Speed Circuit | Synchronizer Enable | SE | Speed Circuit |
| Low Pressure | LP | Clutch Operator | Quick Dump Solenoid | QD | Clutch Operator |
| Neutral | GN | Neutral Switch | Clutch Disengage | CD | Clutch Control |
| Vehicle Underspeed | U | Speed Circuit | Fuel Solenoid | FV | Fuel Shut Off Valve |
| Throttle Switch | TS | Throttle Assembly | | | |
| Engine High | EH | Speed Circuit | | | |
| Ignition On | IGN | Ignition Switch | | | |

SHIFT INITIATE CIRCUIT 115

| SIGNAL IN | LOGIC CODE | FROM | SIGNAL OUT | LOGIC CODE | TO |
|---|---|---|---|---|---|
| Last Up | LU | Gear Counter | Down Enable | DE | Gear Counter |
| Throttle Position | TP | Throttle Assembly | Auto Down | AD | Gear Counter |
| Output Shaft Speed | OS | Speed Circuit | Shift Reset | SR | Gear Counter |
| Last Down | LD | Gear Counter | Auto Up | AU | Gear Counter |
| Ride Through Switch | RTD | Throttle Assembly | | | |
| Calculated Engine Speed | GOS | Speed Circuit | | | |

CLUTCH CONTROL CIRCUIT 116

| SIGNAL IN | LOGIC CODE | FROM | SIGNAL OUT | LOGIC CODE | TO |
|---|---|---|---|---|---|
| Gear Count | GCN | Gear Counter | Coarse Exhaust | CE | Clutch Operator |
| Engine Speed | ES | Speed Circuit | Fine Exhaust | FE | Clutch Operator |
| Throttle Position | TP | Throttle Assembly | Fine Fill | FF | Clutch Operator |
| Clutch Disengage | CD | Command Logic | Coarse Fill | CF | Clutch Operator |
| High Pressure | HP | Clutch Operator | | | |
| Vehicle Underspeed | U | Speed Circuit | | | |
| Engine High | EH | Speed Circuit | | | |
| Engine Low | EL | Speed Circuit | | | |

POWER SUPPLY 117

| SIGNAL IN | LOGIC CODE | FROM | SIGNAL OUT | LOGIC CODE | TO |
|---|---|---|---|---|---|
| | | | Filtered Unregulated Battery Voltage | — | All Circuits |
| | | | Plus 8 volts D.C. | — | All Circuits |
| | | | Minus 6 volts D.C. | — | All Circuits |

FIG. 4A

MECHANICAL AUTOMATIC TRANSMISSION

This is a continuation of application Ser. No. 869,242, filed Jan. 24, 1978, now abandoned.

The invention relates to an electronically controlled mechanical transmission and clutch and more particularly relates to such a system wherein gear selection and shift decisions are made and executed based upon measured parameters such as vehicle and engine speed, rate of change of vehicle and engine speed, etc.

The operator of a modern tractor-trailer must be well trained and possess a substantial degree of skill in order to drive such a vehicle. The operator function which requires perhaps the most skill is the selection of gears and operation of the clutch to ensure that the vehicle is driven in an efficient, economical and safe fashion. For example, the driver must be able to accurately correlate accelerator position and thus motor speed with clutch engagement in order to smoothly commence vehicle motion. If the clutch is engaged slowly while the engine speed is excessive, rapid wear of the clutch faces will result. If the clutch is engaged abruptly under the same conditions, the truck may lurch and buck as it begins to move. Premature clutch repair or damaged cargo may result from such improper operation.

Engagement of the clutch with insufficient engine speed can be equally troublesome. At low R.P.M., the engine may be developing insufficient power to move the vehicle and clutch engagement under these conditions will stall the engine. Should this occur on an upgrade, the vehicle would be in a vulnerable, accident prone situation.

The operation of large trucks with heavy duty transmissions which lack gear synchronizers also requires skill in order to synchronize the speed of the next selected gear with the elements with which it is to be meshed. Commonly this is accomplished by double clutching, i.e., the driver disengages the clutch and shifts the transmission to neutral; next, he re-engages the clutch and attempts to utilize the engine speed to drive the next selected gear into synchronism with the element with which it is to be meshed, then he disengages the clutch, shifts the transmission to the selected gear and re-engages the clutch. It is apparent that this procedure requires a good deal of operator skill and judgment as well as causing accelerated wear on the clutch mechanism due to the additional cycling.

The preceding discussion relates to operation of a tractor-trailer in the most fundamental sense. There are many additional criteria and parameters of operation which are either desirable from an economic standpoint or necessary from a regulatory standpoint. For example, although a skilled driver may be well able to coordinate shifting, clutch and other driving functions, generally no claim would be made that under such human control all gear selections and shift points were optimized for maximum fuel economy. Nor would any claim be lodged that such operation resulted in the vehicle generating a minimum amount of noise, or that the vehicle would always be driven in that gear which provided optimum performance from the overall vehicle load/performance/speed standpoint.

Clearly, what is desired is a system which monitors engine and vehicle speed and acceleration, selects an appropriate gear ratio, synchronizes the meshing transmission elements and controls clutch engagement according to a repeatable and comprehensive logic program. The logic program replaces spontaneous human judgment with repeatable precise responses to all operating conditions to which a vehicle is subjected.

Such systems are represented in the prior art by fully mechanical automatic transmissions incorporating torque converters, epicyclic gear rains and hydraulic pumps. These transmissions have gained wide acceptance in automobiles and light trucks. They represent a high degree of sophistication in their responses to changing vehicle speed, engine speed and driver commands. One goal they have generally failed to achieve is throughput efficiency as high as an equivalent manual transmission. In operation, this lower efficiency manifests itself as higher fuel consumption by a vehicle equipped with an automatic transmission than a comparable vehicle equipped with a manual transmission. In passenger cars where convenience is a major consideration, the fuel consumption penalty of an automatic transmission of five to ten percent is tolerated.

Automatic transmissions of the type used in passenger cars have never been particularly successful when adapted for use in large tractor-trailer vehicles, however. First, the nominal five to ten percent fuel consumption penalty of an automatic transmission becomes a major economic consideration for a tractor builder or user since the fuel consumption penalty tends to be even higher in a large truck transmission. Furthermore, Since the truck may travel 50,000 to 75,000 miles per year, the actual dollar penalty of utilizing an automatic truck transmission will be great.

Fuel consumption, however, is not the greatest drawback encountered in adapting the type of transmission used in lighter vehicles to a truck tractor. Because of the severe and continuous service which truck tractors are called upon to perform, "scaling up", i.e., simply proportionally enlarging all parts to carry increased torque and power has not proven satisfactory due to greatly increased frictional heating, vibration and shock loading experienced by such transmission components. Prior art fully automatic transmissions which were capable of handling the power necessary to propel a large tractor-trailer vehicle were also of intractable dimensions. If such a transmission were to be incorporated into a truck tractor in place of a mechanical transmission, it would require redesigning of the tractor frame, drive train and possibly the cab.

The present invention is an automatic transmission system having automatic gear selection, gear synchronization and clutch engagement which is suitable for use in truck tractors. Rather than utilize a completely mechanical device similar to prior art automatic transmissions, the instant invention utilizes a conventional manual transmission, electric and pneumatic actuators and an electronic analog and digital control system which monitors engine speed, rate of change of engine speed, vehicle speed, rate of change of vehicle speed and throttle position and commands the actuators to upshift or downshift, synchronize the transmission elements and engage or disengage the clutch. The electronic control system is basically a grouping of programmed logic devices which base their decisions to alter the operation of the transmission on the input signals they receive and the steps of the logic program. The logic program represents a codification of operational rules which themselves represent compromises and design choices arrived at through experimentation, computer assisted simulation and empirical data. These compromises and design choices will be more fully explained subsequently.

The system includes components which gather information from the vehicle and operator for utilization by the electronic control system. A mode selector switch allows the operator to select either the automatic mode of operation in which the transmission is fully controlled by the electronic control or the manual mode in which upshifts and downshifts (but not clutch engagement per se) may be commanded by the operator. The selector also includes a neutral and reverse gear mode. The position of a throttle or accelerator pedal is also continuously monitored by the electronic control.

Electronic tachometer type sensors continuously monitor engine speed, output shaft speed and countershaft speed. Signals from these sensors are utilized by the electronic control to evaluate not only the immediate status of the system but are also utilized to compute the status of the transmission if an upshift or downshift were executed. They are further utilized to control and confirm that synchronism between gears which are about to be meshed has been achieved.

The electronic control system generates a signal which upshifts or downshifts the transmission. Another output controls the engagement or disengagement of the clutch in a controlled manner. Another output drives the synchronizer operators which synchronize the speed of transmission elements which are about to be meshed. Still another output controls the flow of fuel to the engine and shuts off fuel in order to slow the engine speed down when desired regardless of the throttle position.

Thus it can be appreciated that the foremost object of the invention is to provide a fully automatic transmission for use in large tractor trucks.

It is also an object of this invention to provide such operation utilizing a transmission which is equal in size to a conventional manual shift transmission.

It is a further object of this invention to provide an automatic transmission which requires a minimum of operator generated inputs, namely mode selection and throttle position.

It is a still further object of this invention to provide an automatic transmission having superior fuel consumption characteristics typical of manual transmissions.

It is a still further object of this invention to provide a system having control over gear selection, upshifting, downshifting and clutch engagement which is capable of accurately and repeatedly making economically and operationally sound decisions in accordance with a precisely defined program of instructions.

Further objects and applications of the instant invention will become apparent by reference to the following specification and drawings.

FIG. 1 schematically illustrates the components and interconnections of a mechanical automatic transmission according to the present invention;

FIG. 2 schematically illustrates the components of the mechanical automatic transmission which cooperatively function with the engine;

FIG. 3 is a full sectional diagrammatic view of a transmission, synchronizer and clutch assembly according to the instant invention;

FIGS. 4 and 4A are a chart of the signal identity, generation point and processing in the central processing unit;

Figure 1:
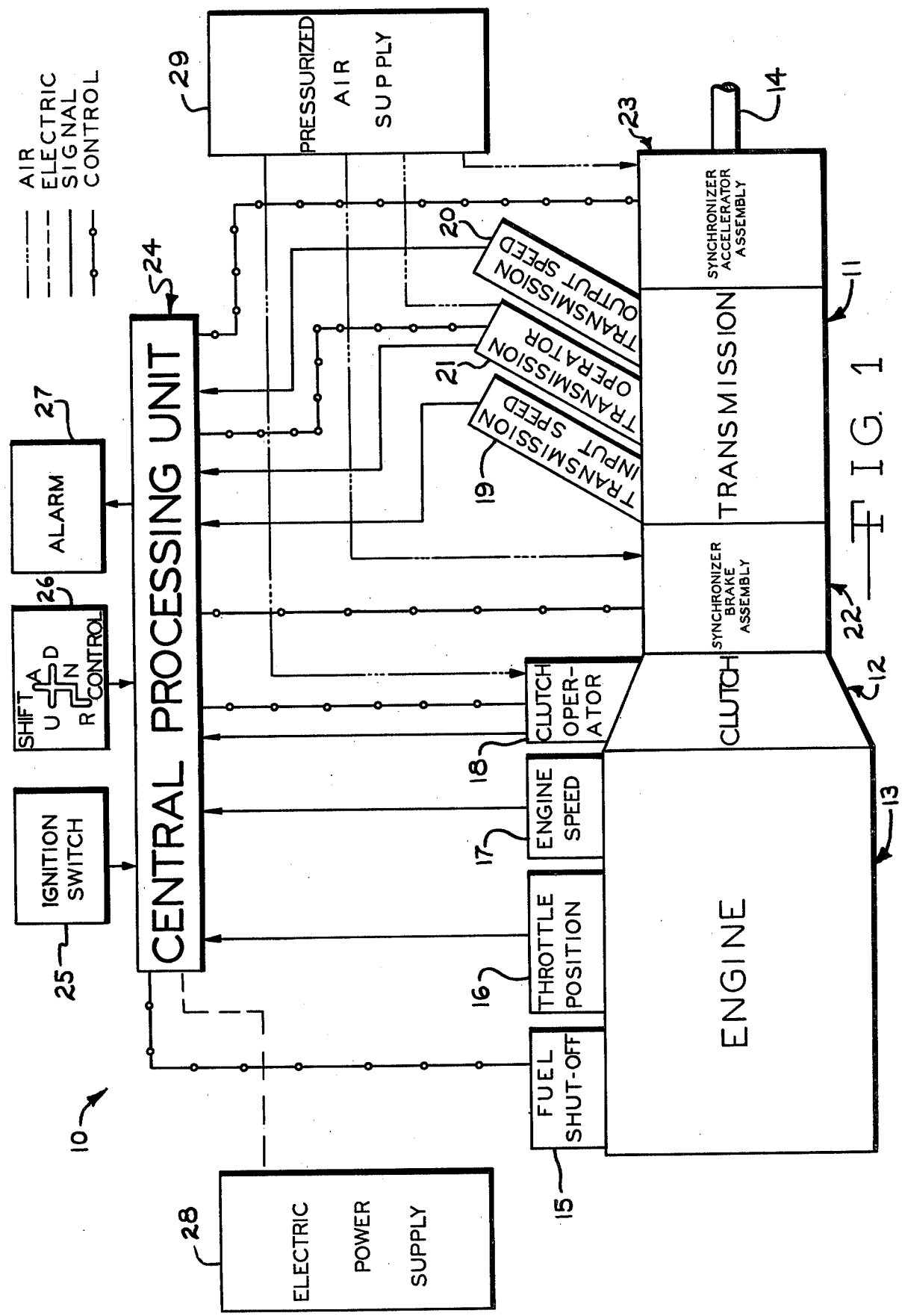

FIG. 1 schematically illustrates the components of the mechanical automatic transmission designated generally by the numeral 10. The automatic transmission 10 comprises a conventional multispeed geared transmission 11 operably connected to a conventional friction plate type clutch 12 which is in turn connected to an engine 13. The output of the automatic transmission 10 is supplied by an output shaft 14 to an appropriate vehicle component such as a differential which forms no part of this invention.

The basic power train components 11-14 just delineated are acted upon and monitored by several devices which will be discussed in greater detail subsequently. These include a fuel shut off valve 15 which stops the flow of fuel to the engine, a throttle position monitor assembly 16 which senses the position of the vehicle throttle, an engine speed sensor 17 which senses the speed of the engine 13, a clutch operator 18 which engages and disengages the clutch 12, a countershaft speed sensor 19 and an output shaft speed sensor 20 which sense the speed of the countershaft (input) of the transmission 11 and the output shaft 14 of the transmission 11, respectively, a transmission shift operator assembly 21 which engages and disengages a selected gear in the transmission 11, and a countershaft brake assembly 22 and a countershaft synchronizer accelerator assembly 23 which cooperatively synchronize the elements of the transmission 11 which are to be engaged.

These devices supply information and accept commands from a central processing unit 24. The processing unit 24 includes analog and digital electronic calculation and logic circuitry illustrated in FIGS. 5 through 9, which will subsequently be described in detail. The central processing unit 24 also accepts an information signal (IGN) from an ignition switch 25 which activates the entire mechanical automatic transmission 10 and from a shift control assembly 26 which in turn accepts driver commands regarding the operational mode of the transmission 10. The central processing unit 24 supplies a signal (ALARM) to an audible alarm 27 which indicates improper or unsafe operating conditions. An electric power supply 28 and a pressurized air supply 29 supply appropriate electric power and pressurized air, respectively, to the various components of the mechanical automatic transmission 10 illustrated in FIG. 1.

Figure 2:
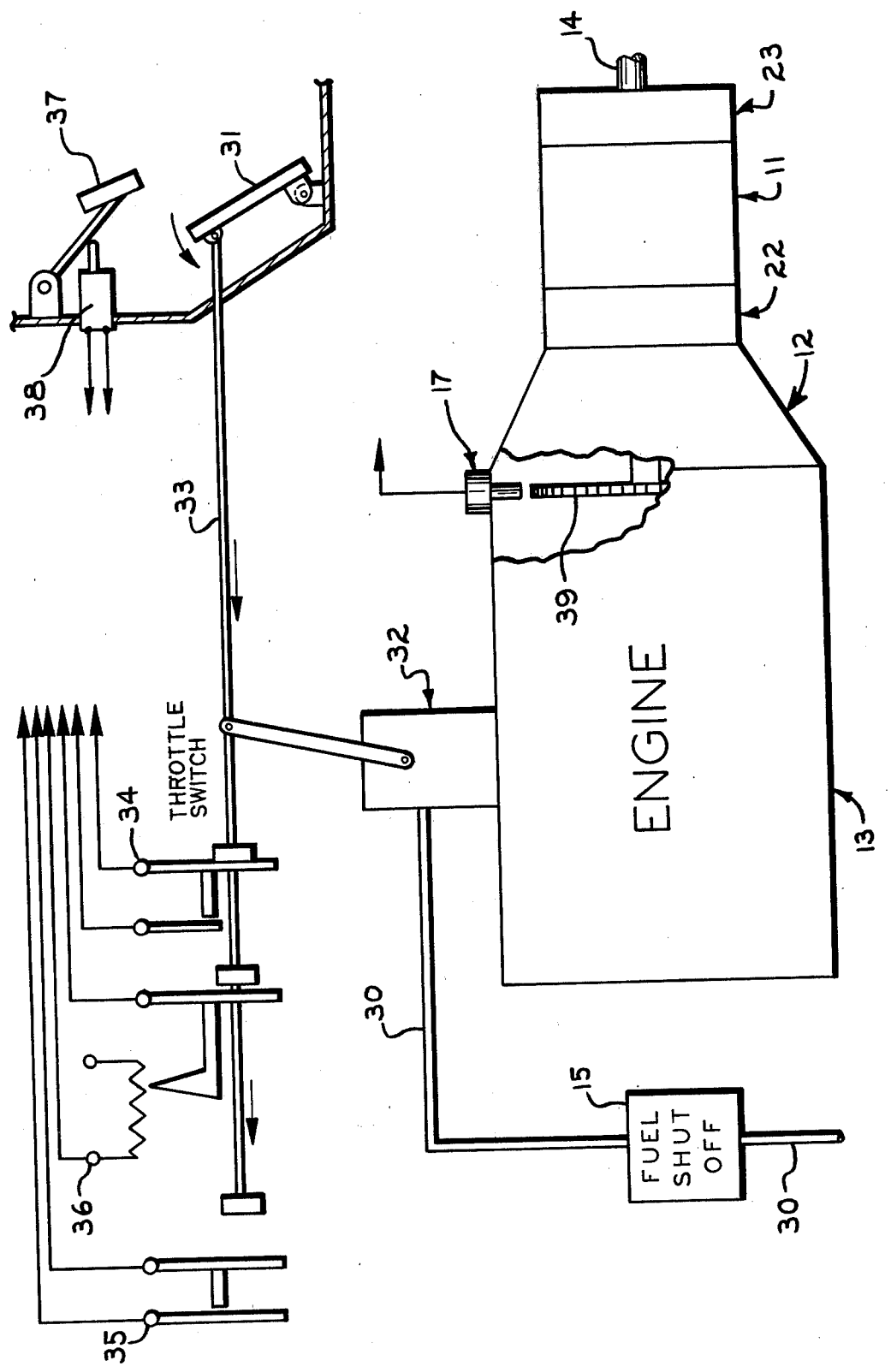

FIG. 2 illustrates the components of the mechanical automatic transmission 10 which are associated with the engine 13. The fuel shut off valve 15 is located in a fuel line 30 which supplies fuel to the engine 13. The shut off valve 15 is under the control of the central processing unit 24. The valve 15 is a normally closed type but is open during normal operation due to the presence of an energizing signal (FV) from the central processing unit 24. When it is necessary to slow the speed of the engine during the gear shift interval when the clutch 12 is disengaged, the valve 15 is de-energized and fuel flow to the engine 13 ceases.

Also associated with the engine 13 is the throttle position monitor assembly 16. An accelerator or throttle pedal 31 mechanically controls a fuel metering device 32 such as a carburetor or disel injectors by way of a linkage 33. The fuel metering device 32 controls the speed of the engine 13 by adjusting the flow of fuel thereinto in response to the position of the throttle pedal 31 in a conventional fashion. The linkage 33 also operates two switches 34 and 35 and a transducer 36. The first switch, throttle switch 34, senses the initial movement of the throttle pedal 31 and closes to indicate the presence of the driver's foot on the throttle pedal 31 providing the throttle switch logic signal (TS). The second switch, the ride-through-detent switch 35, closes to indicate that the throttle pedal 31 is fully depressed to the floorboard and provides the full throttle signal (RTD). The transducer 36 which takes the form of a potentiometer, provides a resistance signal (TP) which varies in direct proportion to the position of the throttle pedal 31 from an idle position when the first switch 34 is open to a full throttle position when the second switch 35 is closed. The on-off signals from the switches 34 and 35, namely TS and RTD, and the proportional resistance signal from the transducer 36, namely TP, are all supplied to the central processing unit 24 and are utilized by the logic and control circuitry therein to control the automatic transmission 10.

In this application the term "means for providing a signal indicating the position of the throttle controlling means" should be taken to include the transducer 36 and switches 34 and 35 which directly represent the throttle setting and also any means for generating a signal indicative of the throttle position. Such signal could be derived, for example, from measurement of fuel flow or rack position on a diesel engine.

A brake pedal 37 is mounted adjacent the throttle pedal 31 and activates the vehicle braking system (not shown) in a conventional fashion. A brake switch 38 which closes when the brake pedal 37 is depressed and the vehicle braking system is activated produces a logic signal (BS) indicating this condition for use by the central processing unit 24.

Also associated with the engine 13 is an engine speed sensor 17 such as a magnetic pickup positioned in radial alignment with a toothed wheel such as an engine flywheel 39. The teeth on the wheel 39 induce fluctuations in the magnetic circuit of the pickup which induce voltage fluctuations in a coil, the output of which is supplied to the central processing unit 24.

Referring now to FIG. 3, the clutch 12, the clutch operator 18, the transmission 11, the transmission speed sensors 19 and 20, the transmission operator 21, the synchronizer brake assembly 22 and the synchronizer accelerator assembly 23 are illustrated.

The clutch 12 is a conventional friction plate design having a spring-biased, circular, axially translatable clutch plate 40 which is advanced into contact with a similar plate affixed to the output shaft of the engine (not shown) and is retracted by the action of several springs 41. The clutch plate 40 moves in response to the motion of a plurality of second class levers 42 which transfer the motion of an actuator assembly 43 to the clutch plate 40. The actuator assembly is in turn acted upon by an expandable annular diaphragm 44 which comprises one wall of an annular chamber 45 into which pressurized air is introduced. The air is introduced into the chamber 45 through a passageway 46. A plurality of conventional electrically operated two-position solenoid valves controls air flow and thus air pressure in the passageway 46 and the chamber 45 from 0 p.s.i. to maximum air pressure.

A fine fill valve 47 has an orifice diameter of approximately 0.020 inches and when energized by the fine fill signal (FF) from the central processing unit 24 allows pressurized air to flow into passageway 46 at a relatively slow rate. The coarse fill valve 48 has an orifice diameter of approximately 0.045 inches and when energized by the coarse fill signal (CF) from the central processing unit 24 allows pressurized air to flow into passageway 46 at a relatively rapid rate. In normal operation the valves 47 and 48 are energized in additive sequence; that is, first the fine fill valve 47 is energized to slowly fill the chamber 45 or incrementally increase the pressure therein, then the coarse fill valve 48 is energized in addition to fine fill valve 47 to rapidly fill the chamber 45.

Similar devices and operating sequences control the exhaust of pressurized air from the clutch chamber 45. A fine exhaust valve 50 has an orifice diameter of approximately 0.030 inches and when energized by the fine exhaust signal (FE) from the central processing unit 24 allows pressurized air in the chamber 45 and the passageway 46 to escape to atmosphere at a relatively slow rate. A coarse exhaust valve 51 has an orifice diameter of approximately 0.060 inches and when energized by the coarse exhaust signal (CE) from the central processing unit 24 allows pressurized air in the chamber 45 and the passageway 46 to escape to atmosphere at a relatively rapid rate. A quick dump valve 52 has an orifice diameter of approximately 0.400 inches and when energized allows pressurized air in the chamber 45 and the passageway 46 to escape to the atmosphere almost instantaneously. The three exhaust valves 50, 51 and 52 are additively sequenced; that is, first the fine exhaust valve 50 is energized by the FE signal to slowly exhaust the clutch chamber 45 or incrementally lower the pressure therein, then the coarse exhaust valve 51 is energized by the CE signal in addition to the fine exhaust valve 50 and a more rapid emptying of the chamber 45 is achieved. If necessary, all three valves 50, 51 and 52 are energized and the air pressure in the chamber 45 will decrease almost instantaneously to zero.

Two pressure switches 53 and 54 sense air pressure in the passageway 46 and provide signals to the central processing unit 24. The low pressure switch 53 is normally closed and opens when pressure in the passageway 46 reaches about 16 p.s.i. to provide a low pressure signal (LP) to the central processing unit 24. This pressure represents the point at which the force produced by the pressurized air in the chamber 45 and transmitted to the clutch plate 40 equals the pre-load in the return springs 41. Therefore, opening and closing of the pressure switch 53 signals the central processing unit 24 that either clutch motion is imminent or that it has just ceased, respectively. The high pressure switch 54 closes when the air pressure in the passageway 46 reaches approximately 55 p.s.i. and provides a high pressure signal (HP) to the central processing unit 24. This pressure represents the point at which the force produced by the pressurized air in the chamber 45 is sufficient to positively seat the clutch plate 40 against the complementary clutch plate attached to the output shaft of the engine 13. At 55 p.s.i. the torque capability of the clutch will be equal to maximum engine torque. Limiting clutch pressure to this level allows the clutch to slip if transient driveline torques in excess of engine torque should develop. This can prevent driveline damage.

FIG. 3 also illustrates the transmission 11 which is a conventional twin countershaft type having an input shaft 55, a plurality of constantly meshed drive gears 56 and driven gears 58 which transfer power at fixed, selectable reduction ratios, and two countershafts 57 and 57A (not shown). The engagement of one selected gear of the plurality of driven gears 58 is accomplished by a plurality of axially translatable splined dog clutches 59 coaxially mounted upon the output shaft 14 and intermediate pairs of the driven gears 58. Inasmuch as the transmission gearing and shifting mechanism is conventional and deemed readily understandable by one skilled in this art, it will not be further discussed.

The dog clutches 59 are moved forward or rearward to accomplish engagement by the transmission shift operator 21. The transmission shift operator 21 comprises a plurality of three position pneumatic cylinders 60, each of the cylinders 60 driving one of the dog clutches 59 to a forward or rearward engaged position and an intermediate neutral position by means of a fork assembly 62. FIG. 3 illustrates only two pneumatic cylinders 60 and the associated valving in section for reasons of clarity. It should be understood that the number of cylinders 60 must be equal to the number of dog clutches 59 and that, commonly, the number of dog clutches 59 will be half the total number of selectable forward and reverse gear ratios in the transmission since each dog clutch 59 can effect the engagement of two gear ratios.

The cylinders 60 each contain a self-centering piston 61 which is attached to a corresponding dog clutch 59 by a fork assembly 62. The pistons 61 each include two end collars 63 and 64 which may slide in the chambers 65 and 66, respectively, between the adjacent end of the cylinder 60 and a fixed stop 67 in the wall of the cylinder 60 or a peripheral rib 68 on the external surface of the piston 61, whichever is contacted first. This, in effect, creates a piston having differential face area which becomes equal when the piston is centered. In operation, with equal air pressure on both sides of the piston 61, the force generated in a given direction depends upon whether the collars 63 and 64 are in contact with either the fixed stop 67 or the peripheral cylinder rib 68. If the collar 63 is in contact with the stop 67, the force generated by the pressurized air against the collar 63 will be grounded against the stop 67 and only the force generated by the pressurized air against the piston 61 will be available to reposition it. If the collar 64 is adjacent the rib 68 on the cylinder 61, the force generated by the pressurized air against the collar 64 will add to that generated by the air against the piston 61 and this force will be greater than the force against the other face of the piston 61. In this manner, the pistons 61 can be positively centered in the cylinders 60 by the application of equal pressure to both sides of the pistons 61 since if a piston is positioned to the left or right of center, the effective area and thus force against the piston 61 will be greater in the direction which tends to center the piston.

Travel of the pistons 61 to the right or left limit of travel is expeditiously effected by supplying pressurized air to the chamber 65 at one end of the piston 61 while exhausting the other chamber 66 to the atmosphere. The pressurizing and exhausting of the cylinders 60 is accomplished by a plurality of three way solenoid valves 69, specifically, two valves for each piston 60 or one for each chamber 63 or 64. The valves 69 are connected to the cylinders 60 through passageways 70 and are connected through a manifold 71 to the air supply of the vehicle (not shown). The valves 69 also include an exhaust port 72 through which pressurized air is allowed to escape to the atmosphere. The solenoid valves 69 are conventional, electrically operated three way valves which when energized block the flow of pressurized air from the manifold 71 and exhaust air from the cylinders 60 to the atmosphere through the exhaust ports 72. Conversely, when the solenoid valves 69 are de-energized, pressurized air from the manifold 71 is allowed to flow into the cylinders 60 and the exhaust ports 72 are closed. Commands to energize and de-energize the valves 69 originate in the central processing unit 24 to which they are electrically connected.

The transmission shift operator assembly 21 further includes a neutral switch 73. The neutral switch 73 mechanically senses the position of the fork assemblies 62 and closes when they are all in their center positions, indicating that the transmission 11 is in neutral. The signal so generated (GN) is used by the central processing unit 24 in a manner which will be described subsequently.

Information is also supplied to the electronic control or central processing unit assembly 24 by speed sensors 19 and 20. These sensors take the form of magnetic pickups, the operation of which was described previously and which are well known in the speed sensing art. The input speed sensor 19 is aligned with one of the plurality of drive gears 56 on one of the countershafts 57 or 57A, senses the countershaft speed of the transmission 11 and supplies this information to the central processing unit 24. Since the countershaft 57 rotates at a fixed speed ratio to the input shaft 55, the countershaft speed measurement may also be used with proper scaling as a measurement of input shaft speed. The output shaft speed sensor 20 is aligned with a toothed wheel 74 attached to the output shaft 14, senses its speed, and supplies this information to the central processing unit 24.

The automatic transmission 10 also includes a countershaft synchronizer brake assembly 22 and countershaft synchronizer accelerator assembly 23 disposed to the front and rear of the transmission 11, respectively. The brake assembly 22 and accelerator assembly 23 cooperate to retard or accelerate the speed of the countershafts 57 and 57A and gears 56 and 58 in order to assure that the speeds of the transmission elements (i.e., the gears 58 and dog clutches 59) about to be engaged are synchronized or nearly synchronized. The mechanism and theory of operation are described fully in my issued U.S. Pat. No. 3,478,851 and only a brief description emphasizing the differences between this device and that described in my patent, which are primarily differences of physical and mechanical arrangement, will be described here.

The synchronizer brake assembly 22 functions to retard the speed of the countershafts 57 and 57A and gears 56 and 58 such that the speed of the particular gear which is about to be engaged or meshed with the output shaft 14 by one of the dog clutches 59 is synchronized with the output shaft 14. Braking is accomplished by a conventional disc pack type clutch assembly 75 consisting of two sets of interleaved plates 76 and 79. The first set of plates 76 includes a plurality of inwardly directed splines 77 which engage a plurality of mating splines 78 affixed to the input shaft 55. The first set of plates 76 is alternated in the disc pack assembly 75 with a second set of plates 79 having a plurality of outwardly directed splines 80 which engage a plurality of mating splines 81 attached to the housing of the transmission 11. Positioned coaxially with the input shaft 55 and aligned radially with the interleaved portions of the plates 76 and 79 is an annular piston 82 which extends and retracts perpendicularly to the interleaved sets of plates 76 and 79 of the disc pack clutch assembly 75. The annular piston 82 is positioned within an annular cylinder 83 to which pressurized air is supplied through a passageway 84 from a single electrically operated three way solenoid valve 85. The air valve 85 includes an exhaust port 86 and when energized supplies pressurized air from the manifold 71 to the cylinder 83 and blocks the exhaust port 86. Conversely, when the solenoid valve 85 is de-energized, the flow of pressurized air from the manifold 71 is blocked and the air from the cylinder 83 escapes to the atmosphere through the exhaust port 86. By supplying pressurized air to the cylinder 83, the disc pack type clutch assembly 75 is compressed increasing the frictional drag between the plates 76 connected to the input shaft 55 and the plates 79 connected to the housing of the transmission 11, thereby slowing the speed of the input shaft 55 and twin countershafts 57 and 57A to facilitate the engagement of the selected dog clutch 59 with one of the driven gears 58.

The countershaft synchronizer accelerator assembly 23 operates in much the same fashion as the countershaft synchronizer brake assembly 22 but is activated to accelerate the countershafts 57 and 57A and gears 56 and 58. This is necessary when the output shaft 14 and the associated dog clutches 59 are rotating more rapidly than the one of the gears 58 which is about to be engaged. The countershaft synchronizer assembly 23 includes a disc pack type clutch assembly 88 having two sets of interleaved plates 89 and 93. The first set of plates 89 includes a plurality of inwardly directed splines 90 which engage mating splines 91 on a collar 92 attached to the output shaft 14. The second set of plates 93 includes a plurality of outwardly directed splines 94 which engage mating splines 95 on the inner surface of a gear 58. The gear 58 is mounted coaxially with the output shaft 14 by means of needle or roller bearings in a manner well known in the art such that it may rotate relative to the output shaft 14. Radially centered on the interleaved portion of the disc pack type clutch assembly 88 is an annular activator 96 which transfers axial force to the disc pack clutch assembly 88 from an annular piston 98 which is positioned within an annular cylinder 99. Interposed between the annular activator 96 and the annular piston 98 is a thrust bearing assembly 97 which facilitates relative rotation between the annular actuator 96 which rotates with the disc pack clutch assembly 88 and the annular piston 98 which is prevented from rotating by a retaining pin 100 oriented parallel to the axis of the output shaft 14. The retaining pin 100 is secured to the rear wall of the annular cylinder 99 and projects into a mating blind hole 101 in the annular piston 98. Compressed air is supplied to the annular cylinder 99 through a passageway 102, extends the annular piston 98, and advances the annular actuator 96 against the disc pack clutch assembly 88, thereby increasing the friction between the two sets of interleaved plates 89 and 93. Thus, the speed of the countershafts 57 and 57A may be raised to ensure that the selected one of the driven gears 58 will be synchronized with its associated dog clutch 59 prior to engagement. A three way electrically operated solenoid valve 103 connected to the manifold 71 has an exhaust port 104. When the valve 103 is energized, the exhaust port 104 is closed, pressurized air flows through the valve 103 and activates the countershaft accelerator assembly 23 in the manner just described. When the valve is de-energized, the flow of pressurized air from the manifold 71 is blocked and the air in the annular cylinder 99 is allowed to escape to the atmosphere through the exhaust port 104. Energy for this synchronizing operation is provided by the kinetic energy of the moving vehicle which is transferred to the transmission 11 by the output shaft 14. It should be understood that the countershaft accelerator assembly 23 must operate in cooperation with the output shaft gear 58A which provides the highest gear reduction, namely, first gear, so that the countershaft accelerator assembly 23 will be capable of driving the countershafts 57 and 57A to the fastest speed necessary in order to achieve synchronization of the transmission gears 58A and the dog clutches 59.

Referring now to FIG. 4, a chart illustrating the production and flow of analog and digital signals and signal processing in the central processing unit 24 is presented. The central processing unit 24 is shown broken down into six operational subsystems, designated by the boxes in FIGS. 4 and 4A. These correspond generally to distinct areas of logic and command function. The logic signals enumerated in FIGS. 4 and 4A are included in the logic signal glossary which also includes a brief description of each logic signal. It should be understood that while FIGS. 4 and 4A delineate all logic signals from all circuits, the following general description of logic signal generation and routing is introductory in nature and does not describe every logic signal.

The central processing unit 24 is divided into six subsystems: a speed and synchronizer circuit 112, a gear counter circuit 113, a command logic circuit 114, a shift initiate circuit 115, a clutch control circuit 116 and a power supply 117. The driver shift control 26 supplies all mode and manual shift instructions to the central processing unit 24 and because of its intimate connection with the logic circuits therein, it will be included in the following description.

The driver shift control 26 logic signals include the four exclusive modes of operation, namely, automatic (AUTO), manual (MAN), neutral (NEUT) and reverse (REV) as well as two momentary commands, upshift (MUP) and downshift (MDN), used by the driver to command shifts in the manual mode. These six logic signals are supplied to the gear counter circuit 113.

Magnetic pickups provide information to the speed and synchronizer circuit 112 regarding the speed of the transmission input shaft 55 or countershafts 57 and 57A, output shaft 14 and engine 13. For the engine 13, the speed and synchronizer circuit 112 generates a direct current signal (ES) directly proportional to shaft speed. For the transmission output shaft 14, two direct current signals are generated. The first (OS) is directly proportional to the speed of the output shaft 14. This signal is also a direct measure of vehicle road speed. In addition, output shaft signal (OS) is amplified (multiplied) by a factor equal to the numerical value of the transmission gear ratio currently selected by the gear counter circuit 113. This provides a DC voltage which is equal to the engine speed if the transmission were in the selected gear with the clutch 12 locked up. This signal is referred to as the calculated engine speed (GOS).

In addition to these analog signals, the speed and synchronizer circuit 112 provides several logic output signals which indicate if shaft speeds are greater or less than preset values. These include an overspeed signal (O) derived from the calculated speed of the engine 13 and a vehicle underspeed signal (U) derived from the speed of the output shaft 14.

The speed and synchronizer circuit 112 also monitors the difference between the output shaft signal (OS) and a calculated output shaft signal. This difference represents the actual speed error between the selected output shaft gear 58A and the output shaft 14. Whenever the absolute value of this error exceeds a predetermined limit, an error signal (E) is provided to the clutch control circuit 116.

When enabled by a signal from the command logic circuit 114, the speed and synchronizer circuit 112 also provides the drive signals (SB and SC) to the appropriate synchronizer assembly 22 and 23.

The primary output from the gear counter circuit 113 is a binary coded information signal (GCN) identifying the specific gear currently selected by it. For neutral and the forward gears a straight three bit binary code is employed. The fourth bit is used for reverse. Another output (ALARM) from the gear counter circuit 113 signals the driver that an illegal shift has been requested through the driver shift control 26. The gear counter also provides, until instructed to forget, signals (LU and LD) indicating the direction of the last shift, i.e., upshift or downshift. The gear counter circuit 113 consists of a four bit up/down counter and the associated control logic. In response to acceptable, valid shift requests, the logic enables a clock input to the counter causing it to count up or down as directed. In the automatic mode (AUTO), shift requests are generated by the shift initiate circuit 115. In the manual mode (MAN), the shift request is produced by the movement of the driver shift control 26 to the upshift (MUP) or downshift (MDN) position. A neutral command (NEUT) from the driver shift control 26 resets the counter. A reverse command (REV), if valid, also resets the counter and provides the bit four output.

The command logic circuit 114 receives signals such as the binary coded gear count information (GCN), vehicle underspeed (U) and the error (E) signal indicating the status of the mechanical automatic transmission 10. Based upon these inputs, it issues two types of commands. The first type is direct signals to the fuel shut off valve (FV) 15 and the transmission operator 21 (M1 through M6 and MR). These may be viewed as direct commands to perform a specific mechanical function such as shutting off the flow of fuel to the engine 13 or engaging a particular gear ratio in the transmission 11. The second type is indirect commands which are used to control the operation of other operators and circuits, primarily the synchronizer assemblies 22 and 23 (SE) and the clutch operator 18 (QD and CD). The command logic circuit 114 consists of combinational logic and delay circuits.

The shift initiate circuit 115 generates logic commands for upshifts (AU) and downshift (AD) in the automatic mode. It also provides a downshift enabling signal (DE) used in both the automatic and manual modes. In addition, there are various other inputs such as the last up (LU) and last down (LD) signals that are used either to prohibit improper shifts or in certain circumstances to initiate shifts.

In the automatic mode, shifts are initiated by the shift initiate circuit 115 based on several factors including calculated engine speed (GOS), vehicle acceleration, position of the throttle 31 (TP), rate of change of throttle position, and the direction of (LU and LD), and time elapsed since, the last shift. In each gear, the signal from the throttle position transducer 36 is modified to produce both an upshift and downshift point.

The clutch control circuit 116 provides the drive signals to the clutch operator 18. There are three main conditions of operation of the clutch 12—disengaged, engaging and engaged. Disengage commands (CD) are issued by the command logic circuit 114. In this circumstance, the clutch control circuit 116 simply passes on the drive signal (CD) to the clutch operator 18. In the absence of a disengage command, operation of the clutch 12 is entirely controlled by the clutch circuit 116. There are two modes of engaging the clutch 12: starting and running. When the calculated engine speed is below a value dependent upon throttle position, clutch engagements are made in the start-up mode. Otherwise, engagement is made in a running mode. There are three subdivisions of the running mode engagement dependent on the actual speed of the engine 13 being greater than, less than or equal to the calculated speed of the engine 13. Comparators in the clutch control circuit 116 make this determination. The result of this determination is provided to the command logic circuit 114 for use in fuel shut off determination. When the clutch 13 is fully engaged, the high pressure (HP) signal from the high pressure switch 54 places the clutch control circuit in the engaged condition.

The power supply 117 operates from the vehicle electrical system to produce all of the required voltage levels necessary to operate the electronics. Typically this will include a filtered unregulated positive battery voltage, regulated +8 volts and −6 volts. The latter is obtained from a device such as a DC to DC converter which is well known in the art.

Figure 5:
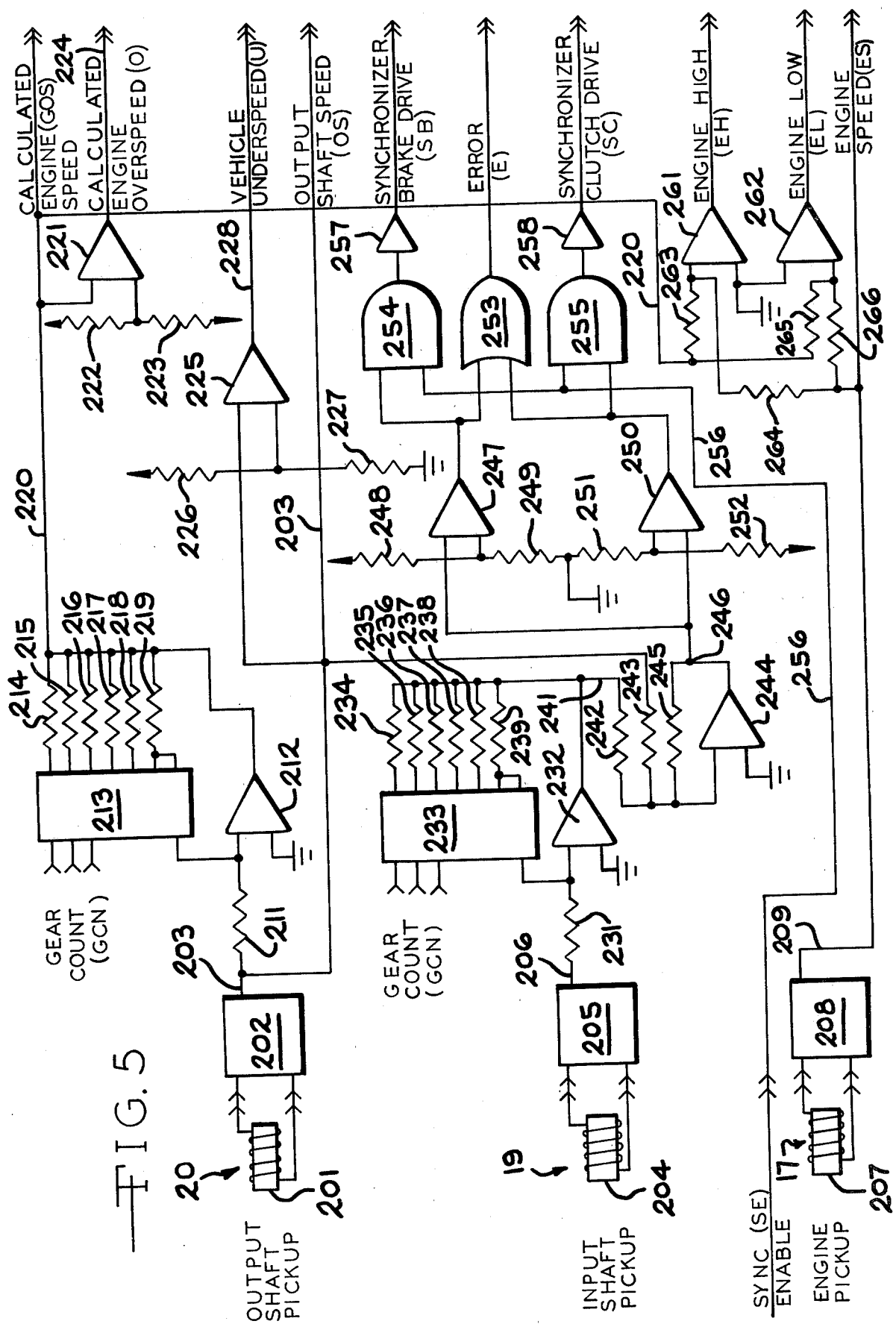
FIG. 5 is a schematic diagram of the speed and synchronizer circuit.

Referring now to FIGS. 3 and 5, the speed and synchronizer circuit 112 includes a transmission output shaft speed sensor 20 which comprises a magnetic pickup 201. The magnetic pickup 201 senses the passage of teeth on a toothed wheel 74 (shown in FIG. 3) which is secured to the output shaft 14. This arrangement produces an AC voltage whose frequency is directly proportional to the rotational speed of the transmission output shaft 14. Operating from the magnetic pickup 201, a tachometer circuit 202 produces a DC voltage in a line 203 which is directly proportional to the frequency of the pickup signal and therefore to the rotational speed of the output shaft 14.

Most of the well known tachometer (or frequency to voltage converter) circuits will be suitable. Typically these circuits consist of a comparator functioning as a zero axis crossing detector. The comparator output triggers a pulse generator whose output is a constant width and amplitude pulse for each trigger. A low pass filter in the tachometer circuit 202 removes the higher frequency components, leaving a DC signal proportional to the speed of the output shaft 14. Alternatively, a single chip tachometer circuit such as the LM 2917 by National Semiconductor may be used.

The input shaft speed sensor 19 comprises a similar magnetic pickup 204 which provides an AC signal to a tachometer circuit 205. The output of the tachometer circuit 205 in a line 206 is a DC voltage proportional to the speed of the input shaft 55 and countershafts 57 and 57A. Likewise, the engine speed sensor 17 includes a magnetic pickup 207 which drives a tachometer circuit 208 which produces a DC voltage in a line 209 which is proportional to the speed of the engine 13.

The output shaft speed signal in the line 203 is amplified by an operational amplifier 212. The gain of the operational amplifier 212 is made directly proportional to the input-to-output shaft gear ratio by the use of a six line to one line multiplexer 213 which receives three bit binary coded information (GCN) from the gear counter circuit 113 and selects the proper one of six feedback resistors 214, 215, 216, 217, 218 and 219 such that the ratio of these feedback resistors to an input resistor 211 provides gain in the operational amplifier 212 equal to the input-to-output shaft gear ratio. The resulting signal represents the speed of the input shaft 55 (GOS) when the transmission 11 is in the gear selected by GCN. It should also be noted that the signal in a line 220 represents the speed of the engine 13 when the driveline is locked up, that is, the transmission 11 is in the gear selected by GCN and the clutch 12 is engaged. In effect, the signal in the line 220 is the calculated speed of the engine 13 (GOS) in the selected gear.

For various logic decisions, it is necessary to know if the input shaft 55 (and countershafts 57 and 57A) or the engine 13 will be subjected to excessive speed upon the completion of a shift. This information (O) is generated by a comparator 221 and its bias resistors 222 and 223. Whenever the voltage in the line 220 representing the calculated speed of the input shaft (GOS) exceeds the reference voltage established by the bias resistors 222 and 223, a positive signal (O) is produced by the comparator 221. The overspeed signal (O) in a line 224 is available immediately after a new gear has been selected and before either the input shaft 55 and the countershafts 57 and 57A or the engine 13 may have accelerated. For this reason, the overspeed signal (O) in the line 224 can inhibit shifts which if completed would result in an overspeed condition. Typically, overspeed indication is set to occur at or slightly above the no-load governed speed of engine 13. Similarly, it is necessary to know if the vehicle speed is above or below a preset minimum. This information (U) is provided by a comparator 225 and two bias resistors 226 and 227. The output shaft speed signal in the line 203 is supplied to the comparator 225 which produces a positive signal (U) in a line 228 whenever the vehicle speed is below a preset minimum speed.

The input shaft voltage signal in the line 206 is fed to an inverting operational amplifier 232 through a resistor 231. The gain of the amplifier 232 is adjusted by a six line to one line multiplexer 233 and associated feedback resistors 234, 235, 236, 237, 238 and 239. The multiplexer 233 receives three bit binary coded information from the gear counter circuit 113 and selectively connects one of the feedback resistors 234, 235, 236, 237, 238 and 239 corresponding to the gear ratio indicated by the signal (GCN) from the gear counter circuit 113 to the input of the operational amplifier 232. The values of the feedback resistors 234, 235, 236, 237, 238 and 239 are such that for each gear, the gain of the operational amplifier 232 is inversely proportional to the gear ratio between the input shaft 55 (or countershafts 57 and 57A) and the output shaft 14. Thus the output voltage in a line 241 is proportional to the speed of the main shaft gear 58 corresponding to the gear identified by the gear count signal (GCN), as calculated by dividing the input shaft speed signal by utilizing the appropriate resistor 234, 235, 236, 237, 238 and 239 corresponding to the selected gear ratio in the feedback circuit of the operational amplifier 232. Furthermore, since the operational amplifier 232 is connected as an inverting amplifier, the signal in the line 241 will be inverted, that is, equal to the negative input shaft speed divided by the selected gear ratio.

The output of the inverting operational amplifier 232 is fed through an isolating resistor 242 and the output of the tachometer circuit 202 in the line 203 is fed through an isolating resistor 243 and to an amplifier 244. A feedback resistor 245 is connected between the input and output of the amplifier 244. The output of the amplifier 244 in a line 246 represents the difference between the positive actual speed of the output shaft 14 as monitored by the sensor 20 and the negative calculated speed of the output shaft produced by the inverting operational amplifier 232-multiplexer 233 combination which receives a signal from the input shaft speed sensor 19. As such, the signal in the line 246 is an error signal which directly represents the relative difference of the speed of the engaging transmission components, namely the main shaft gear 58, identified by the gear count code (GCN), rotating in geared relationship with input shaft 55, and the corresponding dog clutch 59 rotating with the output shaft 14.

The error signal in the line 246 is then fed to a complementary pair of voltage comparators 247 and 250. The output of the voltage comparator 247 goes positive whenever the speed of the selected main shaft gear 58 exceeds the actual speed of the output shaft 14 by an amount equal to the reference level set by the voltage divider resistors 248 and 249. Similarly, the output of the comparator 250 will go positive whenever the speed of the selected main shaft gear 58 is less than the actual speed of the output shaft 14 by an amount equal to the reference levels set by voltage divider resistors 251 and 252. These reference levels are set equal to or less than the acceptable speed error, i.e., the relative difference between the rotational speed of the selected main shaft gear 58 and the output shaft 14, for engaging the dog clutches 59. Typically, this will be on the order of 25 R.P.M. or less.

The output signals from the comparators 247 and 250 are connected as illustrated in FIG. 5 to an OR gate 253 and two AND gates 254 and 255. The OR gate 253 provides a logical error signal (E) to the command logic circuit 114 indicating that a speed error greater than the acceptable level exists between the transmission elements. This signal (E) is utilized by the command logic circuit 114 to control and sequence the shifting process.

It is essential that attempts to synchronize the transmission 11 occur only if certain conditions are met including that the transmission 11 be in neutral with the clutch 12 disengaged. When all conditions are realized and it is desired to synchronize the transmission 11, the command logic circuit 114 provides a sync enable command (SE) in a line 256 to the AND gates 254 and 255. When the sync enable command (SE) is present and there is a positive signal from either the comparator 247 or the comparator 250, the AND gates 254 or 255, through buffers 257 and 258, will provide the necessary drive signals (SB or SC) to the synchronizer brake assembly 22 or the synchronizer accelerator assembly 23 as required by the magnitude and direction of the input-output speed error.

The speed and synchronizer circuit 112 further includes a complementary pair of comparators 261 and 262 driven by the actual engine speed signal (ES) in the line 209 and the calculated engine speed signal (GOS) in the line 220. The signals ES and GOS are supplied to the comparators 261 and 262 through four scaling resistors 263, 264, 265 and 266 connected as shown in FIG. 5. The comparator 261 provides an engine high (EH) signal to the command logic circuit 114 and the clutch control circuit 116 indicating that the actual speed of the engine 13 is above the calculated speed of the engine. The comparator 262 provides an engine low (EL) signal to the clutch control circuit 116 indicating that the actual speed of the engine is below the calculated speed of the engine.

Figure 6:
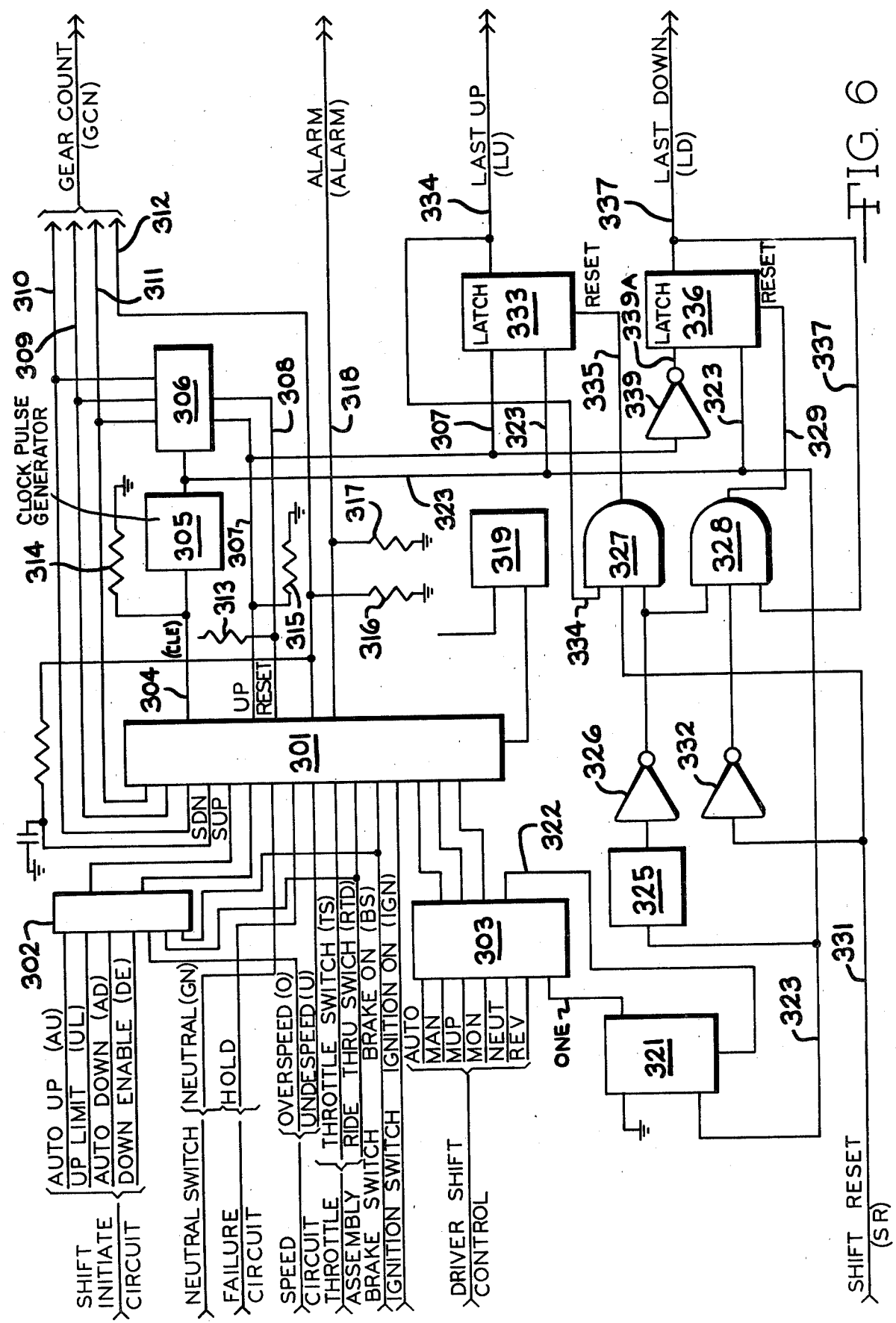
FIG. 6 is a schematic diagram of the gear counter circuit.

Referring now to FIG. 6, the gear counter circuit 113 is illustrated. The primary function of the gear counter circuit 113 is to select the appropriate gear ratio of the transmission 11 in response to the logic signals supplied to it and generate a binary coded signal (GCN) representative of the selected gear ratio for use by other circuits.

The gear counter circuit 113 receives signals from the speed and synchronizer circuit 112, the shift initiate circuit 115, the ignition switch 25, the driver shift control 26, the throttle switch 34, the ride-through-detent switch 35, the brake switch 38 and the neutral switch 73. These signals are supplied to a field programmable logic array 301 and provide the information upon which gear selection is based. Discrete logic elements can also be utilized. Because of the number of inputs to the field programmable logic array 301, two additional logic devices, namely, two read only memories (ROMs) 302 and 303 are utilized to precode the information received from the shift initiate circuit 115 and the driver shift control 26, respectively. The logic instructions of the field programmable logic array 301 and the read only memories 302 and 303 are contained in the logic rules (q.v.). Basically, the logic devices 301, 302 and 303 are programmed to: restrict the binary coded gear count information to the number of forward gears contained in the transmission 11; select a new gear in the automatic mode in response to request to the shift initiate circuit 115; select a new gear in the manual mode in response to explicit driver commands through the driver shift control 26; select either neutral or reverse in response to explicit driver commands; initiate a shift to a starting gear, normally first gear, in the automatic mode; prohibit the selection of any gear in any mode which would result in overspeeding the engine 13; prohibit the selection of the new gear if certain fault conditions are detected in the system; and provide turn-on and shut-down sequences.

The binary coded gear count information (GCN) is generated by a clock pulse oscillator 305 and an up-down counter 306 which are driven by logic outputs of the field programmable logic array 301. The field programmable logic array 301 provides a clock enable signal (CLE) in a line 304 which activates the clock pulse oscillator 305, a logic signal (UP) in a line 307 which is positive or true when an upshift is commanded and null or not true when a downshift is commanded and a logic signal (RESET) in a line 308 which resets the up-down counter 306 to zero. The clock pulse oscillator 305 produces clock pulses typically at a 100 Hertz repitition rate. The clock frequency is not critical. It must be low enough for various circuits, particularly the speed and synchronizer circuit 112 and the shift initiate circuit 115 to respond to the new gear selection. At the same time, it should be sufficiently rapid to allow proper gear selection before the mechanical elements of the system can respond. The binary coded gear count information (GCN) is carried in four lines 309, 310, 311 and 312. The up-down counter 306 counts up whenever pulsed by the clock pulse oscillator 305 while a positive signal (UP) exists in the line 307. Conversely, the up-down counter 306 counts down a count whenever pulsed by the clock pulse oscillator 305 while there is no signal present in the line 307. The current forward gear selected by the gear counter circuit 113 is represented in binary coded form in the three lines 309, 310 and 311. A reset signal (RESET) in the line 308 resets the up-down counter 306 and the signals in the three lines 309, 310 and 311 to zero. The field programmable logic array 301 also produces a logic signal (SR) in the fourth gear count line 312 corresponding to reverse gear. Each of the lines 309, 310, 311 and 312 illustrated in FIG. 6 carries one bit of the binary coded information (GCN). The following chart delineates the binary code utilized to represent the neutral, forward and reverse gears of the transmission 11.

| | GEAR COUNT INFORMATION (GCN) | | | |
|---|---|---|---|---|
| Gear | Logic | Binary Bit Line (FIG. 6) | | |
| Selection | Symbol | 309(C01) | 310(C02) | 311(C03) | 312(C04) |
| Neutral | S$\phi$ | 0 | 0 | 0 | 0 |
| First | S1 | 1 | 0 | 0 | 0 |
| Second | S2 | 0 | 1 | 0 | 0 |
| Third | S3 | 1 | 1 | 0 | 0 |
| Fourth | S4 | 0 | 0 | 1 | 0 |
| Fifth | S5 | 1 | 0 | 1 | 0 |
| Sixth | S6 | 0 | 1 | 1 | 0 |
| Reverse | SR | 0 | 0 | 0 | 1 |

A delay device 319 provides a signal to an enabling input of the field programmable logic array 301. This signal is initiated by the rise of the supply voltage to an acceptable level and persists for a fraction of a second thereafter. While the signal from the delay 319 is present the outputs of the field programmable logic array 301 are not enabled. In this condition the logic levels of the outputs from the field programmable logic array 301 are determined by the resistors connected from these outputs to either the ground or supply voltage levels.

The arrangements of the resistors 313, 314, 315, 316 and 317 are such that the counter 306 is reset, the oscillator is not activated nor is the alarm. Also, the reverse code line 312 is also set to logical zero. In this manner the gear counter 306 is always forced to a neutral selection upon turn-on.

A latch 321 provides a signal which ensures that the up-down counter 306 will count only one step in response to each explicit up or down request by the driver shift control 26. A signal in the line 322 is normally set and held high by the presence of either the auto (AUTO) or the manual (MAN) signal input to the read only memory 303. Whenever an up (MUP) or a down (MDV) shift is requested through the driver shift control 26, the signal in the line 322 will be absent. The absence of the signal in the line 322, concurrent with a clock pulse in a line 323 sets the output of the latch 321 (ONE) low, preventing further shifting. Therefore, after each up or down request, the driver must allow the driver shift control 26 to return to the manual or auto position, setting ONE high before another shift request will be accepted.

The gear counter circuit 113 also generates logic signals (LU and LD) which indicate the direction of the last shift. The latches 333 and 336 store in their outputs lines, 334 and 337, respectively, the signal present on their data inputs, lines 307 and 339A, respectively, at the time their clock inputs lines 323 rise. The data input to 333 is the UP signal in the line 307. The inverter 339 is connected between the UP signal line 307 and the data input of latch 336. Thus the data input to the latch 336 will be positive when the UP signal is not positive.

Thus the output (LU) of the latch 333 in the line 334 will go positive whenever the counter 306 performs an UP count. Similarly, the output (LD) of latch 336 in line 337 will go positive whenever the counter 306 performs a down count. The last up (LU) signal in the line 334 will remain positive until either the counter 306 performs a down count or until reset by a signal in the reset line 335 described subsequently. Similarly, the last down signal (LD) in the line 337 will, once set, remain positive until either the counter 306 performs an UP count or until reset by a signal in the reset line 329 also described below.

The clock pulse (CP) signal in the line 323 is also supplied to a delay device 325. The delay device 325 produces a pulse which begins simultaneously with the clock pulse and continues for approximately 0.5 seconds. This lengthened clock pulse is then supplied to the input of an inverting amplifier 326. The inverting amplifier 326 provides a signal which is true or high whenever the lengthened clock pulse produced by the delay device 325 is not present at its input. The output of the inverting amplifier 326 is supplied to one input of a triple input AND gate 327. The triple input AND gate 327 also receives a shift reset (SR) signal in a line 331 from the shift initiate circuit 115. The third input to the triple input AND gate 317 is supplied by the output of a latch 333. The latch 333 supplies a last up (LU) signal in a line 334 to the shift initiate circuit 115 and the triple input AND gate 327 which is positive or true if the direction of the last shift was up. The signal remains positive until a downshift command is given. When a last up (LU) signal is present in the line 334, a shift reset (SR) signal is present in the line 331 and no delayed clock pulse is present at the input of the inverting amplifier 326 such that its output will be positive, the triple input AND gate 327 will provide a positive signal in a reset line 335 to the latch 333 resetting the output of the latch to a zero or null state.

A similar circuit resets the last down (LD) logic signal which is also supplied to the shift initiate circuit 115. A second triple input AND gate 328 is also supplied with the inverted, delayed clock pulse output from the inverting amplifier 326. In addition, the triple input AND gate 328 receives an inverted shift reset (SR) signal from an inverting amplifier 332 and the last down (LD) signal from a latch 336 in a line 337. Whenever these three conditions are true the triple input AND gate 328 provides a positive signal in the line 329 which resets the output of the latch 336 to a zero or null state.

Figure 7:
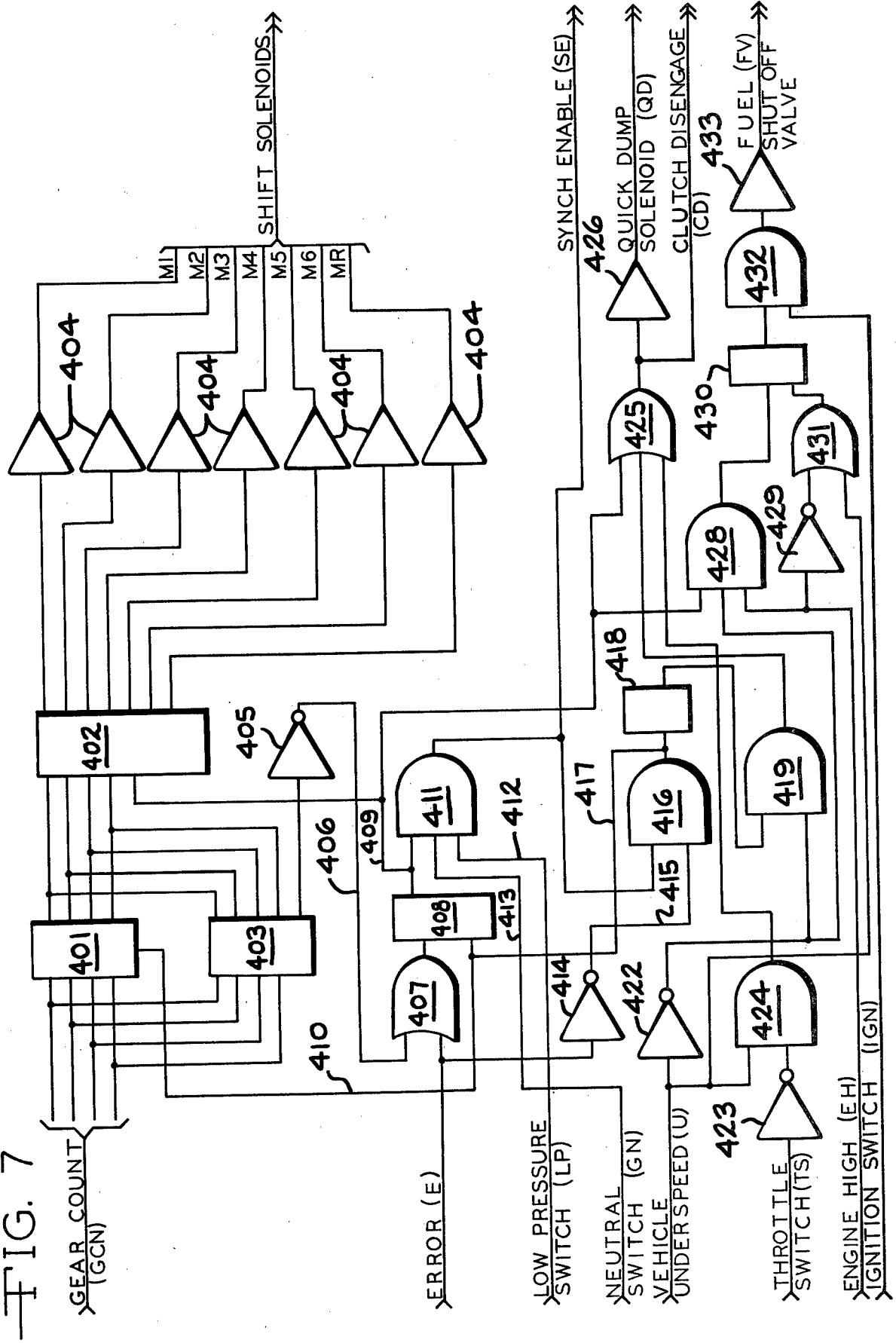
FIG. 7 is a schematic diagram of the command logic circuit.

Referring now to FIG. 7, the command logic circuit 114 which primarily controls the operation of the clutch 12, the fuel shut off valve 15 and the shift solenoids 69, is illustrated. In all cases, the operation of these components results from a determination by the command logic circuit 114 that the transmission 11 is not in the proper gear. This determination is made in two ways: First, is the energizing signal to the solenoid valves 69 in conformity with the gear currently selected by the gear counter circuit 113 and secondly, is the ratio of the speed of the output shaft 14 to the speed of the input shaft 55 equal to the gear currently selected by the gear counter circuit 113?

The first determination is made as follows: The binary gear code information (GCN) from the gear counter circuit 113 is supplied to a four bit latch 401. The output of the four bit latch is supplied to a read only memory (ROM) 402 which decodes the binary gear code into a specific signal for each solenoid valve 69 associated with each gear. A plurality of amplifiers 404 amplifies the specific signal for each solenoid valve 69 from the read only memory 402 to a level sufficient to actuate the solenoid valve 69. The binary gear code information (GCN) to the four bit latch 401 is strobed to the outputs of the latch 401 only when the transmission 11 is about to go into gear. A logic comparator 403 compares the inputs and outputs of the latch 401 and through a logic inverter 405 produces a signal in the line 406 whenever the input and output codes of the latch 401 do not agree. Thus, if at any time the gear selected by the gear counter circuit 113 does not agree with the gear engaged or attempted to be engaged by the transmission 11, a signal is provided.

The second method of determining that the transmission 11 is not in the proper gear is by a comparison of the speeds of the input shaft 55 and output shaft 14. The speed and synchronizer circuit 112 generates an error signal when the actual speed of the output shaft 14 differs from the calculated speed of that shaft arrived at by dividing (or multiplying) the measured speed of the input shaft 55 by the currently engaged gear ratio.

The error signal (E) from the speed and synchronizer circuit 112 and the signal in line 406 are applied to an OR gate 407 whose output drives the set input of an R-S flip-flop 408. Therefore, if either of these determinations indicates that the transmission is not engaged in the selected gear, the flip-flop 408 is set, producing a shift sequence command in a line 409. The R-S flip-flop 408 is reset by a signal from the AND gate 416 in the line 417.

The command logic circuit 114 also provides a sync enable command (SE) in the line 256 which controls the operation of the synchronizer brake assembly 22 and the synchronizer accelerator assembly 23 through the speed and synchronizer circuit 112. The sync enable command (SE) in the line 256 is produced by a triple input AND gate 411. The output of the triple input AND gate 411 is positive when there is a shift sequence command in the line 409 from the R-S flip-flop 408, a signal (LP) in a line 412 from the low pressure switch 53 that the clutch 12 is disengaged and the signal (GN) in a line 413 from the transmission neutral switch 58 indicates that the transmission 11 is in neutral.

The error signal (E) from the speed and synchronizer circuit 112 is also supplied to an inverting amplifier 414, and thus a signal in a line 415 indicates that nob error signal is present at the input of the amplifier 414 and vice versa. This inverted error signal in the line 415 and the sync enable signal (SE) in the line 256 are both supplied to a dual input AND gate 416. When both input signals to the AND gate 416 are positive, it provides a logic signal in a line 417 to both the reset input of the R-S flip-flop 408 and a delay device 418. The delay device 418 immediately passes the logic signal in the line 417 to one input of a dual input AND gate 419 when the signal in the line 417 becomes positive and continues to provide a signal to the input of the dual input AND gate 419 for approximately one-tenth of one second after the signal in the line 417 has ceased. Thus the signal in the line between the delay device 418 and one input of the dual input AND gate 419 represents a condition of the system wherein there is both no error signal (E) from the speed and synchronizer circuit 112 and the presence of a sync enable signal (SE) in the line 256. Furthermore, the signal in the line between the delay device 418 and the one input of the dual input AND gate 419 continues for approximately one-tenth of a second after either of the previously recited conditions ceases to exist.

The underspeed signal (U) from the speed and synchronizer circuit 112 is applied to an inverting amplifier 422 and the output, indicating the lack of an underspeed signal, is connected to the other input of the dual input AND gate 419. The output of the AND gate 419 thus represents the condition of the system wherein a logic signal exists in the line between the delay device 418 and one input of the dual input AND gate 419 and the output of the inverting amplifier 422 is positive indicating that there is not an underspeed condition.

The signal (TS) from the throttle switch 34 is supplied to an inverting amplifier 423. The output of the inverting amplifier 423 is thus positive when the operator's foot is not on the throttle and the throttle switch 34 is not closed. The signal from the inverting amplifier 423 is supplied to one input of a dual input AND gate 424. The underspeed signal from the speed and synchronizer circuit 112 is connected to the second input of the dual input AND gate 424. The output of the dual input AND gate 424 is thus positive when both an underspeed condition of the vehicle is signaled by the speed and synchronizer circuit 112 and the throttle switch 34 and inverting amplifier 423 produce a signal indicating that the driver's foot is not on the throttle.

Three signals, that from the output of the R-S flip-flop 408 in the line 409, the output from the dual input AND gate 419 and the output from the dual input AND gate 424 are fed to a triple input OR gate 425. The OR gate 425 produces a positive output whenever at least one of the three inputs is positive. The output of the triple input OR gate 425 is the clutch disengage signal (CD) and as such is supplied to the clutch control circuit 116 and an amplifier 426. The amplifier 426 is similar to the amplifiers 404 and increases the output signal from the triple input OR gate 425 to a level sufficient to directly drive the quick dump solenoid 52 in the clutch operator 18.

Normally upshifts will occur with the throttle 31 open. As soon as the clutch 12 disengages, the engine 13 will tend to accelerate to its no load governed speed. For this reason, provision is made to dip the throttle during a shift in order to lower the speed of the engine 13 to the approximate speed it will achieve after the shift is completed. The comparators 261 and 262 in the speed and synchronizer circuit 112 indicate when the actual speed of the engine 13 is greater or less than the calculated engine speed. The engine high signal (EH) from comparator 261 is supplied to both one input of a triple input AND gate 428 and an inverting amplifier 429. The triple input AND gate 428 is also supplied with a signal from the inverting amplifier 422 which indicates the lack of an underspeed condition in the engine and the shift sequence command in line 409 which is generated by the R-S flip-flop 408. When all three inputs of the triple input AND gate 428 are positive, it generates a positive output which is fed to the set input of an R-S flip-flop 430. The output of the inverting amplifier 429 which is positive when there is not an engine high signal (EH), is fed to one input of a dual input OR gate 431. The second input of the dual input OR gate 431 is connected to the underspeed signal (U) which feeds the inverting amplifier 422 and dual input AND gate 419. Thus, when either there is no engine high signal (EH) indicated by the presence of an output from the inverting amplifier 429 or there is an underspeed signal (U), there will be a positive output from the dual input OR gate 431 which is fed to the reset input of the R-S flip-flop 430. The output of the latch or R-S flip-flop 430 is thus positive and remains positive whenever the set input is positive because the triple input AND gate 428 inputs are all positive. The latch or R-S flip-flop 430 output ceases whenever the reset input of the latch or flip-flop 430 is positive by virtue of one or both of the inputs of the dual input OR gate 431 being positive. The output of the latch or R-S flip-flop 430 is supplied to one input of a dual input AND gate 432. The second input of the dual input AND gate 432 is driven by a signal (IGN) indicating that the ignition switch is in the on position. Therefore, when both the output of the latch or R-S flip-flop 430 and the signal (IGN) from the ignition switch 25 is positive, a positive output will be generated by the dual input AND gate 432 and be amplified by an operational amplifier 433. The output of the operational amplifier 433 will be of sufficient level to drive the fuel shut off valve 15 and provide fuel to the engine 13.

Figure 8:
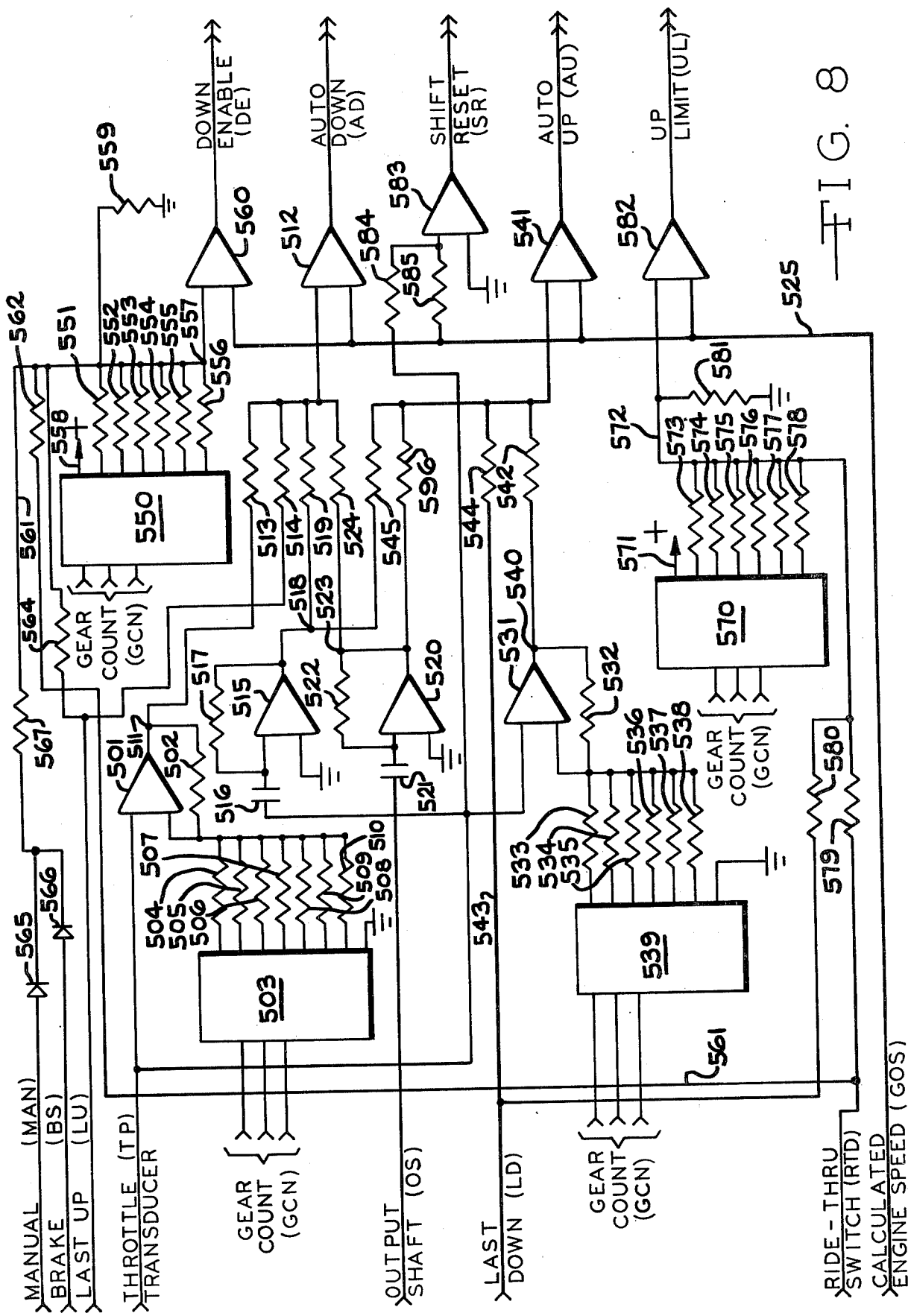
FIG. 8 is a schematic diagram of the shift initiate circuit.

Referring now to FIG. 8, the shift initiate circuit 115 is illustrated. The shift initiate circuit 115 produces shift enabling signals based primarily upon the throttle position (TP) signal versus the calculated speed of the engine (GOS).

An amplifier 501 receives a signal from the throttle transducer 36 and generates the basic throttle modulated shift point signal for downshifts. A feedback resistor 502 is connected between the input and output of the amplifier 501. The gain of the amplifier 501 is adjusted by the selective introduction of one of a plurality of resistors 504, 505, 506, 507, 508, 509 and 510 into the feedback circuit of the amplifier 501 by the use of an electronic switch 503. The resistors 504, 505, 506, 507, 508, 509 and 510 are proportionately scaled to generally represent the gear ratios available in the transmission 11. The electronic switch 503 receives the binary coded gear count information (GCN) from the gear counter circuit 113 representing the currently selected gear. The electronic switch 503 connects one of the plurality of resistors 504, 505, 506, 507, 508, 509 and 510 representing the currently selected gear between ground and the feedback circuit of the amplifier 501. Thus, the gain of the amplifier 501 is controlled by the feedback resistor 502 and the resistor selected by the electronic switch 503 such that the signal in the line 511 represents the signal from the throttle transducer 36 scaled by a value determined by the resistor corresponding to the gear currently selected by the gear counter circuit 113. The signal in the line 511 is connected to the first input of a comparator 512 through an isolation and scaling resistor 513. Also connected to the first input of the comparator 512 is the last up (LU) signal from the gear counter circuit 113. This signal is supplied to the comparator 512 through an isolation and scaling resistor 514.

The signal (TP) from the throttle transducer 36 is also supplied to the input of an amplifier 515 through a capacitor 516. A feedback resistor 517 is connected between the input and output of the amplifier 515. So connected, the amplifier 515 operates as a differentiating amplifier, the output of which in a line 518 is proportional to the rate of change of the throttle transducer 36. The polarity of the amplifier 515 is such that the output is positive when the rate of change of the throttle transducer 36 position is decreasing and negative when the rate of change of the throttle transducer 36 position is increasing. The output of the differentiating amplifier 515 is also supplied to the first input of the comparator 512 through a scaling and isolation resistor 519.

A fourth signal, representing the rate of change of output shaft speed is also supplied to the first input of the comparator 512. The signal from the speed and synchronizer circuit 112 representing the speed of the output shaft 14 is supplied to an amplifier 520 through a capacitor 521. A feedback resistor 522 is connected between the input and the output of the amplifier 520. So connected, the amplifier 520 operates as a differentiating amplifier and the signal in a line 523 thus represents the rate of change of output shaft speed. The output of the differentiating amplifier 520 is inverted, i.e., when the speed of the output shaft 14 is increasing, the output of the differentiating amplifier 520 is negative and vice versa. The signal in the line 523 is then supplied to the comparator 512 through an isolation and scaling resistor 524.

A signal (GOS) from the speed and synchronizer circuit 112 representing the calculated speed of the engine is supplied to the second input of the comparator 512 in a line 525. Whenever the signal in the line 525 representing the calculated speed of the engine (GOS) is less than the sum of the voltages supplied to the first input of the comparator 512 through the scaling and isolation resistors 513, 514, 519 and 524, an auto-down (AD) signal is generated at the output of the comparator 512. This downshift request signal (AD) is utilized by the gear counter circuit 113 to institute a downshift command.

A similar circuit is utilized to generate an upshift request signal (AU). The signal (TP) from the throttle transducer 36 is also supplied to an amplifier 531. A feedback resistor 532 is connected between the input and output of the amplifier 531. A plurality of individually selectable resistors 533, 534, 535, 536, 537 and 538 and an electronic switch 539 are also connected in the feedback circuit of the amplifier 531. The electronic switch 539 receives binary coded gear count information (GCN) from the gear counter circuit 113 indicating the gear currently selected by that circuit and connects the resistor corresponding to the currently selected gear into the feedback circuit of the amplifier 531. Thus, the gain of the amplifier 531 is selected by the electronic switch 539 in accordance with the gear currently selected by the gear counter circuit 113 and the signal in a line 540 represents the position of the throttle transducer 36 as modified by the amplifier 531. The signal in the line 540 is supplied to a first input of a comparator 541 through an isolation and scaling resistor 542. Also summed at the first input of the comparator 541 is the last down (LD) signal from the gear counter circuit 113. This signal (LD) is supplied in a line 543 through a scaling and isolation resistor 544.

Two additional inputs are also summed to the first input of the comparator 541, namely, the signals representing the rate of change of throttle position and the rate of change of output shaft speed. The signal in the line 518 represents the rate of change of position of the throttle transducer 36 and is supplied to the first input of the comparator 541 through a scaling and isolation resistor 545. The signal in the line 523 represents the rate of change of speed of the output shaft 14 and is supplied to the first input of the comparator 541 through an isolation and scaling resistor 546.

The signal (GOS) in the line 525 representing the calculated engine speed from the shift and synchronizing circuit 112 is supplied to the second input of the comparator 541. When the signal (GOS) at the second input of the comparator 541 representing the calculated engine speed is greater than the sum of the signals at the first input of the comparator 541, an auto-up (AU) signal is generated by the comparator 541 and supplied to the gear counter circuit 113.

The shift initiate circuit 115 further generates a down enable signal (DE) which permits or inhibits a requested shift based upon a comparison of the maximum allowable downshift speed for each gear with the calculated engine speed (GOS). An electronic switch 550 and a plurality of proportional scaling resistors 551, 552, 553, 554, 555 and 556 produce a voltage in a line 557 in proportion to the currently selected gear as indicated by the binary coded gear count information (GCN) supplied to the electronic switch 550 from the gear counter circuit 113. The electronic switch 550 receives a constant voltage in the line 558 and selects the one of the plurality of resistors 551, 552, 553, 554, 555 and 556 which corresponds to the gear currently selected by the gear counter circuit 113 and produces a voltage in the line 557 determined by the currently selected gear. A scaling resistor 559 is connected between the line 557 and a circuit ground. The voltage in the line 557 is supplied to one input of a dual input comparator 560 and the other input of the comparator 560 is driven by the signal (GOS) in the line 525 representing the calculated engine speed.

The voltage in the line 557 is modified by the presence or absence of several additional signals. The signal (RTD) from the ride-through-detent switch 35 is summed with the signal in the line 557 through a scaling resistor 562. Likewise, the last up (LU) signal is scaled by a resistor 564 and summed in the line 557. Finally, a signal (MAN) from the manual position of the driver shift control 26 or a signal (BS) from the brake switch 38 are supplied through diodes 565 and 566, respectively, through a resistor 567 and to the line 557. The presence or absence of signals from the ride-through-detent switch 35 (RTD), the last up (LU) signal from the gear counter circuit 113, the brake signal (BS) from the brake switch 38 and the manual (MAN) signal from the driver shift control 26 are all summed in the line 557 and thus modify the operating point at which a down enable (DE) command is generated by the comparator 560. Whenever the signal (GOS) in the line 525 representing the calculated speed of the engine is less than the sum of the signals in the line 557, a down enable (DE) signal is generated by the comparator 560.

The signal from the gear counter circuit 113 is also supplied to an electronic switch 570. The electronic switch 570 receives a constant voltage in the line 571 and produces a scaled voltage in the line 572 directly proportional to the currently selected gear as indicated by the binary coded gear count information (GCN) supplied from the gear counter circuit 113. This is accomplished, as has been previously described, by selecting one of a plurality of scaling resistors 573, 574, 575, 576. 577 or 578 having values proportionately scaled to the gear ratios of the transmission 11. Signals from the ride-through-detent switch 35 (RTD) which are scaled through a resistor 579 and from the line 543 carrying the last down (LD) signal from the gear counter circuit 113 which are scaled through a resistor 580 are also summed in the line 572. The other input of the comparator 582 is driven by the calculated engine speed signal (GOS) in the line 525. Whenever the signal in the line 525 representing the calculated engine speed is greater than the signal in the line 572 representing the currently selected gear ratio as modified by the ride-through-detent switch 35 signal (RTD) and last down (LD) signal in line 543 from the gear counter circuit 113, the comparator 582 generates an up limit (UL) signal.

Finally, the throttle transducer 36 also supplied a signal (TP) to one input of a comparator 583 through a scaling and isolation resistor 584. The signal (GOS) in the line 525 representing the calculated speed of the engine is also supplied to this input of the comparator 583 through a scaling and isolation resistor 585. The other input of the comparator 583 is grounded. The signal (GOS) in the line 525 representing the calculated speed of the engine is summed with the signal (TP) from the throttle transducer 36 and when the input voltage at the comparator 583 exceeds a threshhold value, it furnishes a shift reset (SR) signal for the latches 333 and 336 in the gear counter circuit 113 which generate the last up (LU) and last down (LD) signals.

Figure 9:
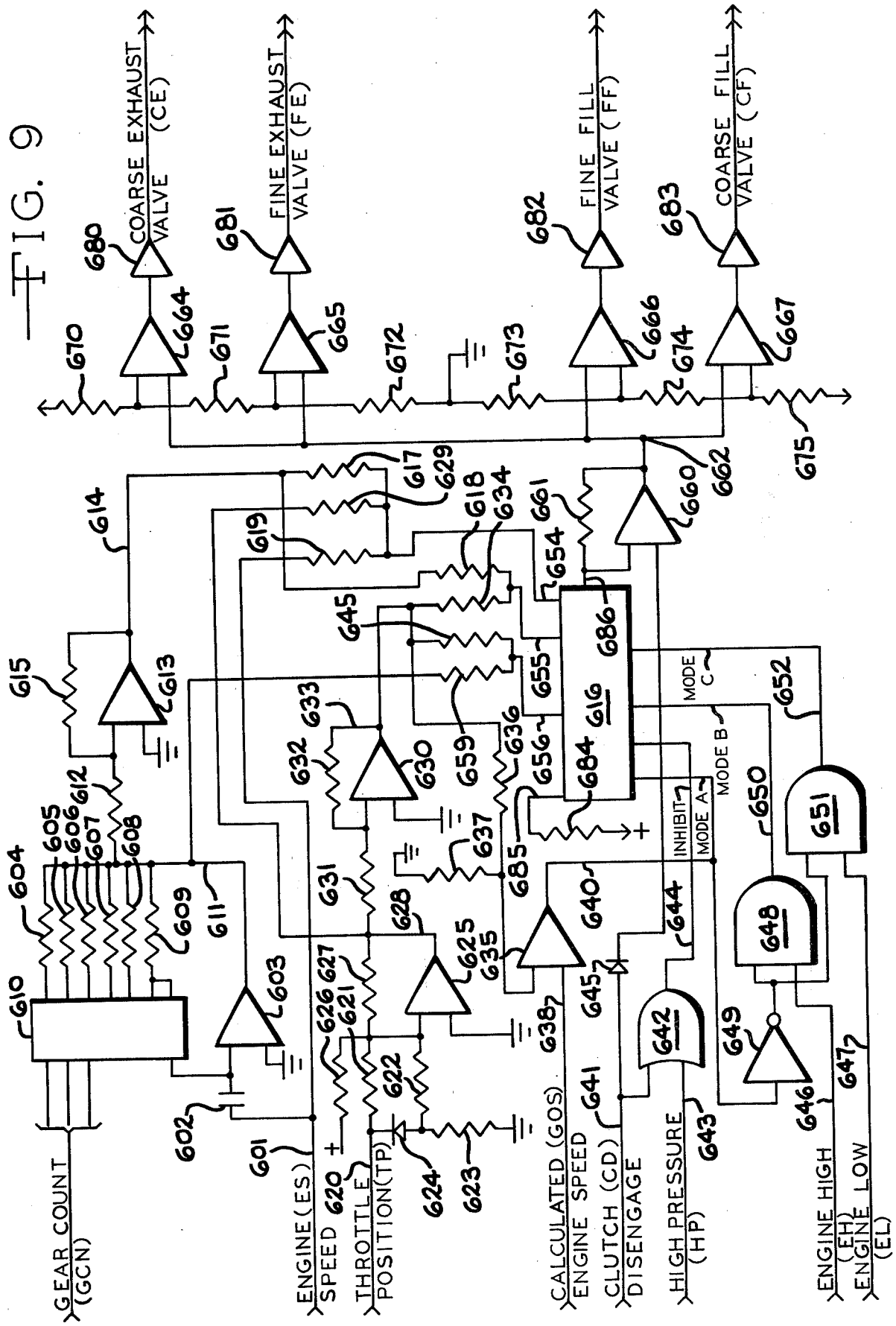
FIG. 9 is a schematic diagram of the clutch control circuit.

Referring now to FIG. 9, the clutch control circuit 116 is illustrated. The clutch control circuit 116 receives a signal (ES) from the speed and synchronizer circuit 112 in a line 601 which represents the speed of the engine 13. This signal is supplied through a capacitor 602 to an inverting amplifier 603. So connected, the inverting amplifier 603 operates as a differentiating amplifier and produces an output which represents the rate of change of engine speed. The gain of the differentiating inverting amplifier 603 is controlled by a plurality of resistors 604, 605, 606, 607, 608 and 609 and an electronic switch 610 connected in the feedback circuit of the amplifier 603. The electronic switch 610 receives the binary coded gear count information (GCN) from the gear counter circuit 113 and selects the resistor of the plurality of resistors 604 through 609. Thus the signal in a line 611 represents the inverted rate of change of the engine speed scaled by a value determined by the gear currently selected by the gear counter circuit 113. The signal in line 611 is supplied through a resistor 612 to an amplifier 613. The amplifier 613 is connected as an inverting amplifier and therefore the output of the amplifier 613 represents the positive rate of change of engine speed. A feedback resistor 615 is connected between the input and the output of the amplifier 613 and the values of the resistors 612 and 615 are adjusted such that the gain of the amplifier 613 is unity. The signals in the lines 614 representing the positive rate of change of engine speed and the signal in the line 611 representing the inverted or negative rate of change of engine speed are each supplied to a multiplexer 616 through resistors 617 and 618, respectively. The engine speed (ES) signal in the line 601 is supplied to the multiplexer 616 through a scaling resistor 619.

The clutch control circuit 116 also receives a signal (TP) from the throttle position transducer 36 in a line 620. The signal from the throttle transducer 36 is modified by resistors 621, 622, 623 and a zener diode 624 and supplied to the input of an inverting amplifier 625. Also associated with the inverting amplifier 625 is a resistor 626 which supplies a positive offset voltage to the input of the inverting amplifier 625. The magnitude of the offset voltage supplied by the resistor 626 is equal to or slightly greater than the voltage produced by the throttle transducer 36 when the engine 13 is idling. A feedback resistor 627 is connected between the input and the output of the inverting amplifier 625 and controls the gain of the amplifier 625. The zener diode 624 has a voltage rating typically equal to 60 to 70 percent of the voltage supplied by the throttle transducer 36 at full throttle. At throttle settings below the zener voltage of the diode 624, the voltage at the junction of the resistors 622 and 623 will be zero. The output voltage of the inverting amplifier 625 will thus increase linearly with respect to the position of the throttle transducer 36. The gain of the amplifier 625 is set by the value of the resistor 627 and 621 plus the offset voltage supplied through the resistor 626. When the voltage in the line 620 generated by the throttle transducer 36 is greater than the zener voltage of the zener diode 624, the difference between the throttle voltage and the zener voltage will appear as an additional input signal to the amplifier 625 through the resistor 622. Thus the signal at the output of the inverting amplifier 625, in a line 628, increases negatively and linearly with increased throttle position until the zener diode 624 begins to conduct at which time the slope of the line indicating this linear negative increase changes.

The negative throttle signal in the line 628 is also supplied to another inverting amplifier 630. The inverting amplifier 630 with its associated input resistor 631 and feedback resistor 632 is adjusted to have unity gain and reinverts the inverted throttle position (TP) signal supplied by the inverting amplifier 625 such that at the output of the inverting amplifier 630, in a line 633, the signal increases positively as the throttle position signal (TP) increases. Furthermore, as was the case with the inverted signal in the line 628, when the zener diode 624 begins to conduct, the slope of the line representing the relationship between throttle position and voltage in the line 633 changes. The signal in the line 633 is also supplied to one input of a dual input comparator 635 through a resistor divider consisting of a resistor 636 connected to one input of the comparator 635 and a resistor 637 connected from that same point to ground. The second input of the dual input comparator 635 receives a signal (GOS) in a line 638 representing the calculated engine speed from the speed and synchronizer circuit 112. Whenever the calculated engine speed (GOS) in the line 638 is less than the signal supplied to the dual input comparator 635 by the inverting amplifier 630, a positive signal is generated by the comparator 635 and appears in a line 640. A positive signal in the line 640 enables what will be denominated a Mode A engagement cycle by the clutch 12. The Mode A engagement cycle will be discussed subsequently.

The clutch control circuit 116 also receives a clutch disengage (CD) signal from the command logic circuit 114 in a line 641. This signal is supplied to one input of a dual input OR gate 642. The second input of the dual input OR gate 642 receives a signal (HP) in a line 643 from the high pressure switch 54 associated with the clutch 12. Whenever the clutch disengage (CD) signal in the line 641 or the high pressure (HP) signal in the line 643 is positive, the dual input OR gate 642 provides a positive signal in a line 644 to the multiplexer 616. The clutch disengage (CD) signal in the line 641 is also supplied to an inverting amplifier 660.

Two additional signals are supplied to the clutch control circuit 116 from the speed and synchronizer circuit 112. These are the engine high (EH) signals supplied in a line 646 and the engine low (EL) signals supplied in a line 647. The engine high (EH) signal is positive whenever the speed of the engine 13 as sensed by the engine speed sensor 17 is faster than the speed of the input shaft 55 of the transmission 11 as sensed by the transmission input speed sensor 20. The engine low (EL) signal is positive whenever the speed of the engine 13 as sensed by the engine speed sensor 17 is slower than the speed of the input shaft 55 of the transmission 11 as sensed by the transmission input speed sensor 19. The engine high (EH) signal is supplied to one input of a dual input AND gate 648. The second input of the dual input AND gate 648 is driven by the output of an inverting amplifier 649. The input of the inverting amplifier 649 is driven by the Mode A signal in the line 640. Thus, the output of the inverting amplifier 649 is positive when a Mode A signal does not exist in the line 640 and vice versa. It therefore follows that the output of the dual input AND gate 648, designated Mode B, in the line 650 is positive when both a Mode A condition does not exist and an engine high (EH) signal does exist. The Mode B signal in the line 650 is also supplied to the multiplexer 616. The output of the inverting amplifier 649 which is positive when a Mode A signal is not present is also supplied to one input of a dual input AND gate 651. The second input of the dual input AND gate 651 is driven by the engine low (EL) signal in the line 647. Thus, when no Mode A signal and an engine low signal (EL) are present, the dual input AND gate 651 provides a positive Mode C signal in a line 652. The Mode C signal in the line 652 is also supplied to the multiplexer 616.

Before continuing with the description of the clutch control circuit 116, the significance of the four modes of clutch engagement, namely Mode A, Mode B, Mode C and Mode D will be explained. These modes refer to the four possible conditions under which the clutch may be called upon to engage. Mode A represents a clutch engagement condition wherein the output shaft 14 is not rotating or rotating slowly. Mode B designates that condition wherein the engine 13 is operating at a speed in excess of the speed of the input shaft 55 of the transmission 11. Under this condition of engagement, the engine 13 will generally slow down as the clutch 12 is engaged. Mode C engagement refers to that condition wherein the speed of the engine 13 is slower than that of the transmission input shaft 55. Here, the speed of the engine 13 will generally increase as the clutch 12 is engaged. The fourth mode of clutch engagement, Mode D, exists when the vehicle is moving and the engine speed and the input shaft speed are equal or very nearly equal, that is, when neither Modes A, B or C exist.

The multiplexer 616 receives the Mode A signal in the line 640, the Mode B signal in the line 650, the Mode C signal in the line 652 and the inhibit signal in the line 644. These are the control inputs to the multiplexer 616. When the inhibit signal in the line 644 is zero, the multiplexer 616 connects one of its inputs on lines 654, 655, 656 or 685 to its output on a line 686. A positive Mode A signal in the line 640 connects the line 654 to the line 686. A positive Mode B signal in the line 650 connects the line 655 to the output line 686. A positive Mode C signal in the line 652 connects the line 656 to the output line 686. In the absence of a Mode A signal in the line 640, a Mode B signal in the line 650 and a Mode C signal in the line 652, the multiplexer 616 connects a line 685 to the output line 686. This corresponds to a Mode D condition. If the inhibit signal in the line 644 is positive, the multiplexer 616 disconnects all inputs from the output line 686. Thus, in Mode A engagements, the positive rate of change of engine speed signal in the line 614 through a resistor 617, the engine speed (ES) signal in the line 601 through a resistor 619, and the negative throttle signal in the line 628 through a resistor 629 are all connected to the output line 686 of the multiplexer 616.

In Mode B engagements, the positive rate of change of engine speed in the line 614 through a resistor 618 and the positive throttle signal in the line 633 through a resistor 634 are all connected to the output line 686 of the multiplexer 616.

In Mode C engagements, the negative rate of change of engine speed signal in the line 611 through a resistor 659 and the positive throttle signal through a resistor 645 are all connected to the output line 686 of the multiplexer 616.

In Mode D engagements, the positive supply voltage through a resistor 684 is connected to the output line 686 of the multiplexer 616.

An amplifier 660 has a feedback resistor 661 connected from its output in a line 662 to its negative input on the line 686 which is also the output of multiplexer 616. Connected in this fashion, the amplifier 660 and its associated resistor 661 operates as an inverting amplifier. The positive input of the amplifier 660 is connected to the clutch disengage (CD) signal in the line 641. Except when the clutch disengage (CD) command is present, this input will be at ground potential. During engagements, therefore, the output of the amplifier 660 in a line 662 will be the weighted sum of the input signals, the weighting being proportional to the ratio of the feedback resistor 661 to the input resistors connected to the amplifier 660 via multiplexer 616.

The signal in the line 662 is supplied to one input of dual input comparators 664, 665, 666 and 667. Voltage divider resistors 670, 671, 672, 673, 674 and 675 provide various positive and negative voltages from the positive and negative voltage supplies and establish voltage set points for the comparators 664, 665, 666 and 667. The outputs of the comparators 664, 665, 666 and 667 drive amplifiers 680, 681, 682 and 683, respectively, which in turn operate the exhaust valves 51 and 50 and the fill valves 47 and 48. If the signal in the line 662 is less than the lowest set point voltage, namely, those voltages associated with the operation of the comparator 665 and the fine exhaust valve 50 and the comparator 666 and the fine fill valve 47, all the comparator outputs will be zero and all clutch air valves will be off. As the clutch error signal departs from zero and increases in either the positive or negative direction above the set point voltages of the comparators 664 through 667, one or more of the comparators will provide outputs and operate the corresponding clutch air valves.

Mode A engagements normally occur when the vehicle is starting from or very nearly from rest. In this condition the output of the amplifier 660 in the line 662 will be equal to the weighted sums of the throttle position (TP) signal minus the engine speed (ES) signal and minus the rate of change of engine speed. If the combination of engine speed and engine acceleration is less than the weighted throttle signal, the output of the amplifier 660 will be positive and depending on the magnitude may cause the comparators 665 or 665 and 664 to operate the fine exhaust valve 50 or the fine exhaust valve 50 and the coarse exhaust valve 51. The result of these valve operations will be a reduction of air pressure in the clutch chamber 45 with a consequent reduction in clutch torque. This reduced torque reduces the torque loading on the engine 13 permitting it to accelerate.

Conversely, if the combination of engine speed and engine acceleration is greater than the weighted throttle signal, the output of amplifier 660 in the line 662 will become negative. Again, depending on the magnitude of the signal in the line 662, this may cause the comparators 666 or 666 and 667 to operate the fine fill valve 48. Operating these valves causes increased air pressure in clutch chamber 45 and consequently increased torque capability for the clutch. This will load the engine.

When the combination of engine speed and rate of change of engine speed is equal or nearly equal to the weighted throttle signal, the output of amplifier 666 on line 662 will be small and no valve will be operated. Thus, the overall system response is to adjust the clutch torque such that the engine 13 operates at or close to a speed set by the weighted throttle position.

In a normal Mode A start, when the driver depresses the throttle pedal 31, he increases fuel flow to the engine 13 causing it to accelerate. At the same time the clutch control circuit 116 will cause the clutch torque to increase until the engine speed is held at the speed set by the weighted throttle position signal. The resulting torque will accelerate the vehicle. During this time the clutch 12 is transmitting torque in a slipping manner with the engine speed greater than the transmission input shaft speed. As the vehicle road speed increases the transmission input shaft speed increases. Eventually the input shaft 55 and engine 13 will be at the same speed. When this happens the engine speed will begin to increase causing the clutch to be rapidly engaged.

Mode B engagements occur when the vehicle is moving and the engine speed at the time of engagement is greater than the transmission input shaft speed. Normally this occurs after an upshift. In this mode the inputs connected to the amplifier 600 via the multiplexer 616 are those connected to the line 655. These are the positive rate of change of engine speed and the positive weighted throttle position signal. As has been described above, the weighted sums of these signals appearing at the output of the amplifier 660 will cause operation of one or more of the fill or exhaust valves depending on the direction and magnitude of the amplifier output. In this case increased clutch torque will tend to cause the engine 13 to slow down. This engine deceleration causes a negative voltage to appear on the line 614. Typically, the weighted throttle signal in the line 633 will cause the output of the amplifier 660 to become negative operating the fine fill valve 47 and/or the coarse fill valve 48. The resulting increase in clutch air pressure increases the clutch torque and causes increased deceleration of the engine 13. This process continues until the negative signal on line 614 resulting from the engine deceleration balances the positive weighted throttle signal in the line 633.

The system action is such that during a Mode B engagement, the engine is caused to decelerate at a rate set by the weighted throttle signal. The relative values of the quantities at the balance condition, i.e., no output from the amplifier 660, are set by the ratio of the resistors 618 and 634. Furthermore, the rate of change of engine speed is weighted by the gain of the amplifier 603 depending upon the transmission gear engaged.

Thus during a Mode B engagement the clutch is engaged such that the engine speed is caused to decelerate at a rate dependent both on throttle position and transmission gear ratio. The various factors are weighted to produce proper engagement in all circumstances. The torque produced by the clutch will react through the driveline and the engine-transmission mounts. Improper engagements could lead to undesirably high transient torque in the driveline and/or a feeling of a harsh or jerky engagement to the driver.

The variation in transmission gear ratio is compensated by the variation in the weight of the engine rate term in the line 614 caused by the variation in gain of the amplifier 603. Further, at light throttle settings, the weighted throttle signal in the line 633 will be relatively small, thereby calling for a relatively small rate of engine deceleration. Under these circumstances, the developed torque at balance will be small. As the throttle 31 is depressed further, the weighted throttle signal in the line 633 increases calling for a greater rate of engine deceleration and therefore higher torques. Thus light throttle engagements can be made extremely smooth in all gears. As the throttle is depressed the engagements are more rapid but with some increase in torque.

Mode C engagements occur when the vehicle is moving and the engine speed at the time of engagement is less than the transmission input shaft speed. Normally, this is the result of a downshift. In this circumstance the torque developed by engaging the clutch 12 will cause the engine 13 to accelerate. The accelerating engine will produce a negative signal in the line 611. Analogous to the case of the Mode B engagement, this signal in the line 611 is balanced by the weighted throttle position signal in the line 633. In all other respects, the Mode C engagement will be the same as a Mode B engagement except that the engine 13 will be accelerating.

In either a Mode B or Mode C engagement the result of the clutch torque will be to cause the engine speed to approach the input shaft speed. When this difference is small or zero, the Mode D engagement conditions occur. Under these circumstances, the multiplexer 616 connects the line 685 to the amplifier 660 via the line 686. Now the input signal to the amplifier 660 is the positive supply voltage through the resistor 684. This causes the output of the amplifier 660 in the line 662 to have a large negative signal operating both the fine fill valve 47 and the coarse fill valve 48. The result is to engage the clutch at the fastest possible rate. Since the speed difference across the clutch is effectively zero, the rapid engagement will not cause a transient driveline torque.

The clutch disengage (CD) signal in the line 641 and the high pressure (HP) signal in the line 643 directly affect the engagement of the clutch 12 through the multiplexer 616. An inhibit (INHIBIT) signal is produced by the dual input OR gate 642 whenever either the clutch disengage (CD) or high pressure (HP) signal is present. The inhibit (INHIBIT) signal in the line 644 disconnects the input of the inverting amplifier 660 from all speed and throttle position information fed to the multiplexer 616. When only the clutch disengage (CD) signal is present, the inhibit (INHIBIT) signal is generated by the OR gate 642 as just described and a clutch error signal is produced by the clutch disengage signal (CD) in the line 641. The clutch disengage (CD) signal is supplied to the positive input of the inverting amplifier 660. When the clutch disengage (CD) signal is present, the clutch error signal in the line 662 becomes strongly positive and triggers both comparators 664 and 665 which in turn opens the coarse exhaust valve 51 and the fine exhaust valve 50, respectively. When only the high pressure signal (HP) is present, the dual input OR gate 642 provides the inhibit (INHIBIT) signal in the line 644. When this inhibit signal is present, the multiplexer 616 disconnects all input to the inverting amplifiers 660 and the clutch error signal in the line 662 becomes zero. Thus, no fill or exhaust valves will be on. In this fashion, the pressure in the chamber 45 of the clutch operator 18 can be maintained at a constant predetermined level.

Figure 10:
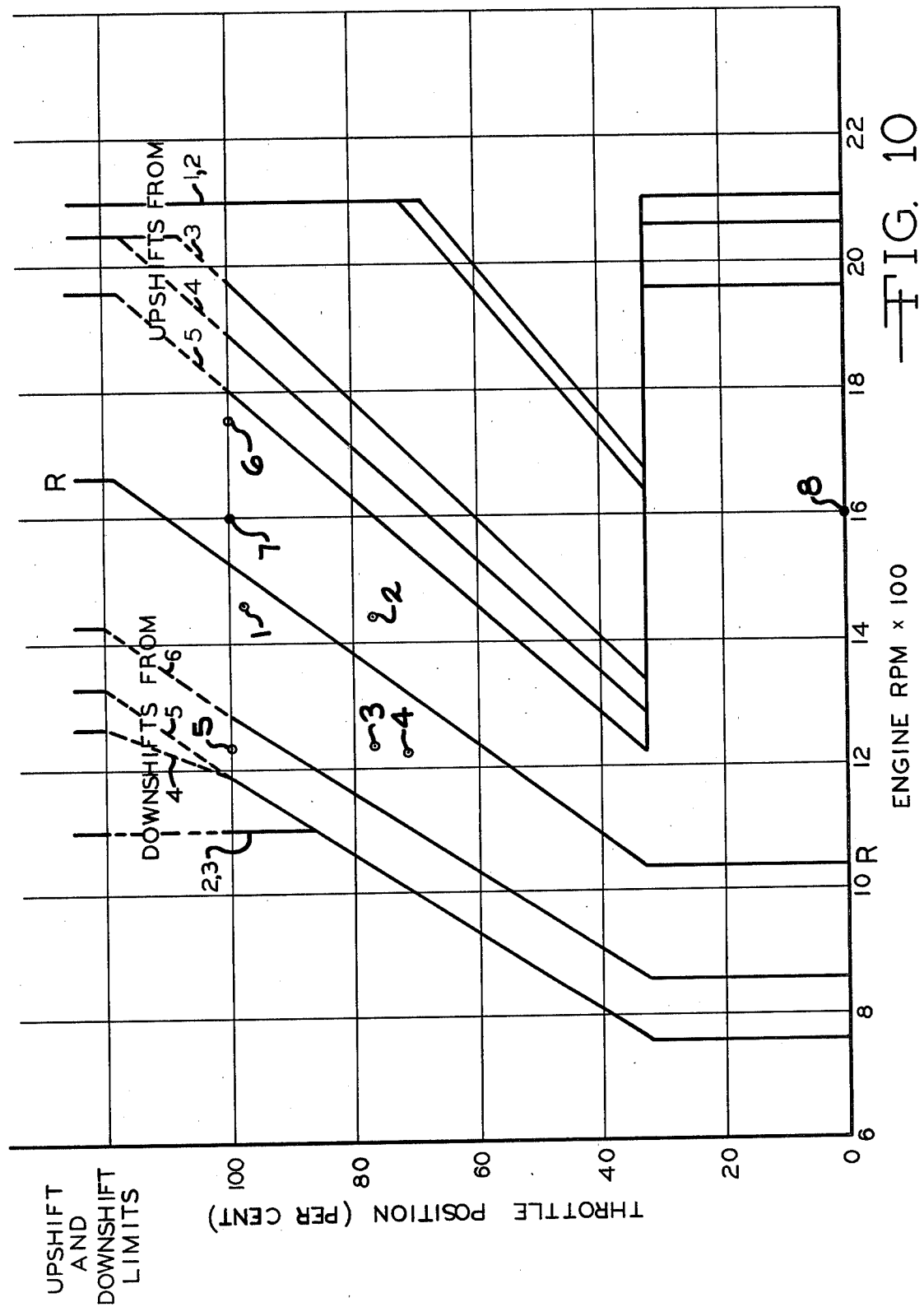
FIG. 10 is a graph of engine speed versus throttle position illustrating the shift points of the mechanical automatic transmission.

Referring next to FIG. 10, the shift point generation by the transmission 10 will be described.

Gear selection, engine operating conditions and vehicle performance are interrelated. The shift initiate circuit 115 controls gear selection in such a manner as to maintain optimum performance. This optimum may be varied by design to satisfy differing vehicle configurations, applications and purchaser or operator goals. To meet these diverse requirements, a number of input signals are utilized including engine speed in the adjacent gears; vehicle acceleration; throttle position, and rate of change of throttle position; the direction and time elapsed since the last shift, and history of engine speed since the last shift.

To facilitate understanding of these circuits, reference is made to FIG. 10, a map of the static shift point profiles for the six forward gears of the transmission 11. Calculated engine speed (GOS) is plotted along the abscissa, and throttle position (TP) is plotted along the ordinate.

The shift point profiles consist of three sections. First is the region from 35 to 100 percent of throttle position in which the shift points increase linearly with throttle position. Second, there are a series of full throttle upshift and downshift limits for each gear. These are illustrated along the limit line above 100 percent throttle position. Finally, in the region from 0 to 35 percent throttle, the downshift points are fixed at the 35 percent throttle value while upshifts are fixed at the full throttle upshift limit value.

In each gear a pair of voltage signals are generated which are derived from the throttle position (TP) signal. These voltages are compared with voltage signals representing the calculated engine speed (GOS). Thus, the downshift and upshift lines are graphical representations of the relationship between these generated voltages and the throttle position (TP) signal, but plotted in terms of their corresponding engine speed equivalency. These lines will be referred to as the throttle modulated shift profiles.

Normally the operating point, 1, will fall between the downshift profiles on the left and the upshift profiles on the right. If the engine operating point, 1, should move to the left of the downshift profiles, an auto-down (AD) request is sent to the gear counter circuit 113. Correspondingly, if the operating point, 1, moves to the right of the upshift profiles an auto-up (AU) request is generated.

The shift initiate circuit 115 provides a pair of such profiles for each gear. (Note that in the cases of the first and top gears, one profile is meaningless, i.e., no upshift is possible above top gear.)

The shift profiles are typically displaced equally on either side of the peaks of the fuel consumption curves, thereby constraining operation to the most fuel efficient regions. It would be desirable from a fuel efficiency standpoint to have the shift profiles as close to the peaks as possible. They must, however, be separated at least by the split between the various gear ratios of the transmission 11.

For the system illustrated, the transmission has ratios of 7.47, 4.08, 2.26, 1.47, 1.00 and 0.778 in gear one through six, respectively. As an example of the limited success achieved by utilizing only static upshift and downshift profiles, assume the vehicle were operating in fifth gear and gradually accelerating (Point 2). At 1600 R.P.M. an upshift to sixth gear would be requested. In sixth gear the engine speed would be reduced by the numerical ratio of the fifth gear ratio to the sixth gear ratio, i.e., 1600÷1.00/0.778 or 1250 R.P.M. This corresponds to Point 3 on FIG. 10. As shown, Point 3 lies to the right of the downshift line and the upshift could therefore be made. If the shift profiles had been closer together, a situation could arise in which Point 3 fell to the left of the downshift profile. Should this occur, the transmission would hunt, that is, each upshift would result in an immediate downshift command which in turn would produce another upshift. Such instability or hunting is unacceptable.

In the preceeding illustration, it was assumed that all conditions remained constant during and immediately after the shift. In reality, few of these conditions will remain constant. During a shift the drive line torque will be momentarily interrupted. As a consequence, vehicle speed will not remain constant. Demand horsepower requirements may be rapidly varying as would occur if the vehicle encountered a grade. Finally, the driver may alter the throttle setting before, during or as a consequence of the shift.

In the shift initiate circuit 115, the basic throttle modulated shift profiles are modified to properly account for the various dynamic conditions and to interpret the driver intentions as indicated by throttle pedal movement. These various modifications and their purposes are described next.

In order to permit the throttle modulated shift profiles shown in FIG. 10 to be spaced as close as possible, provision is made to alter their location depending upon recent history. To accomplish this, the gear counter circuit 113 provides signals indicating the direction of the last shift. These signals, last up (LU) and last down (LD), are generated at the time the gear count changes and are stored in a memory.

After each upshift, the last up (LU) signal modifies the downshift profiles. This modification has two components. A static component moves the downshift profiles from the normal position, illustrated in FIG. 10, to lower engine speeds. This offset will typically amount to 100 to 150 R.P.M. In addition to this static shift, the downshift profiles are temporarily offset an additional 100 to 150 R.P.M. The downshift profiles then recover to the static left offset of 100 to 150 R.P.M. over a period of several seconds.

In a similar fashion, the upshift profiles are moved to the right after each downshift.

As stated, the static portion of the offset is retained while the last up (LU) or last down (LD) signal remains. Additional circuitry is provided to reset the memory. After each upshift, a memory reset is generated when the engine operating point crosses the reset line RR from the left to right. After a downshift, a reset signal is generated if the operating point crosses the reset line RR from right to left.

The reset line RR may be allowed to move dynamically. Typically, this involves moving the reset line RR approximately 300 R.P.M. to the left after an upshift and a like amount to the right after a downshift.

These movements permit the throttle modulated shift profiles to be close together without causing hunting. Moreover, the transient portions allow the system to ignore various transient oscillations of the driveline which may occur as the result of a shift. The reset provision minimizes the probability that operation will occur outside of the range defined by the static (not offset) throttle modulation profiles.

The static downshift and upshift profiles also neglect the effects of vehicle acceleration and deceleration. In the shift initiate circuit 115, this factor is included in the shift decision by offsetting the throttle modulated downshift and upshift profiles by an amount proportional to vehicle acceleration and deceleration. Typically, the downshift profiles are offset to the left at the rate of 7.2 R.P.M. per M.P.H. per minute of vehicle acceleration and to the right a corresponding amount for vehicle deceleration. The upshift profiles are offset to the right at the rate of 16.4 R.P.M. per M.P.H. per minute of vehicle deceleration. There is no corresponding left offset of the upshift profiles for vehicle acceleration.

The effects of this movement can be illustrated with two examples. First consider the case of vehicle operating at Point 4 in FIG. 10. Stable operation implies that the throttle position has been adjusted so that the power delivered by the engine matches that being consumed by the vehicle, i.e., the speed of the vehicle is constant. Assume that the driver now goes to full throttle. The operating point will shift to Point 5. On a static shift profile basis, this would result in a downshift moving the operating conditions to Point 6. The engine horsepower will then be substantially above demand and the vehicle will accelerate resulting in a requirement for an upshift to the original gear.

Allowing vehicle acceleration to move the shift profile to the left can leave Point 5 to the right of the downshift line and no downshift will occur. The excess horsepower will still be adequate to accelerate the vehicle and an unnecessary sequence of shifts will be avoided.

As a second example, consider a vehicle operating at full throttle above 1600 R.P.M. that encounters a grade sufficient to cause a requirement for a downshift. On a static basis the engine speed would have to drop all the way to 1300 R.P.M. before the downshift would occur. The deceleration induced move of the shift profile would cause the downshift to occur at a higher engine speed enhancing vehicle performance.

Additionally, the shift profiles may be moved in response to the rate of throttle movement. Consider, for example, a vehicle operating at Point 7 which encounters a downgrade on which the driver does not wish to accelerate. His normal response will be to back off the throttle moving to operating Point 8. At Point 8 no upshift would occur since the gear counter circuit 113 will not perform an upshift at zero throttle. On the other hand, as the operating point traversed the region between Points 7 and 8, an upshift would occur. Having the rate of change of throttle position move the upshift profile to the right will avoid this problem. Similarly, in returning from Point 8 to 7, the upshift profile should again be shifted to the right. Thus, the upshift profile is typically shifted to the right by the absolute value of the rate of change of throttle position.

By themselves the throttle modulated shift profiles could result in improper shifts. For example, under no circumstances can a downshift be permitted which would result in excessive engine speed. Thus, the shift initiate circuit 115 includes a limiting downshift speed for each gear. In order for a downshift to occur in either the automatic or manual modes, the calculated engine speed (GOS) must be less than the down enable (DE) value.

A limiting speed for upshifts, upshift limit (UL), is also provided. This limit is desirable for two reasons. First, in many cases the throttle modulated shift profile, particularly with large splits between gears, can lead to excessively high upshift speeds at full throttle. Secondly, the various factors which move the upshift profile can move the upshifts to even higher speeds.

In the automatic (AUTO) mode an upshift will be requested if the calculated engine speed (GOS) exceeds either the modulated value (AU) or the limiting value (UL).

There will normally be a full family of settings, one for each gear. Typically, the upshift limit (UL) values will be set close to the speed at which the engine governor begins to restrict full throttle horsepower. The down enable (DE) limit is then set such that it is approximately the gear split below the uplimit setting for the next lower gear. For example, in the case of the transmission with a 1.28 split between fifth and sixth gears, the down enable setting for sixth gear would be roughly equal to the uplimit setting for fifth gear divided by 1.28.

Separation of these limiting signals, UL and DE, is governed by the gear splits. As is the case of the modulated profiles, these limiting values are shifted by the last up (LU) and last down (LD) signals. As is shown in FIG. 10, the down enable speed is lowered by the last up (LU) signal while the upshift limit (UL) speed is increased by a last down (LD) signal.

Provision is also normally made to move the limiting signals in response to other operating conditions. Down enable (DE) is active in the manual (MAN) mode. In manual, the limit is typically raised close to the maximum at which a downshift can safely be made without exceeding the no load governed speed of the engine.

In some applications it is desirable to give the driver additional control of the shift points.

The down enable (DE) signal permits downshifts in the manual (MAN) mode only if the calculated engine speed (COS) is below the set point. In the manual (MAN) mode the down enable (DE) set point is normally moved to the highest speed, in each gear, at which a downshift can be completed without exceeding the maximum safe engine speed.

It is desirable and/or necessary to employ engine compression braking when descending long or steep grades. Under these conditions the driver's foot would not be on the throttle and downshifts would occur at low engine speeds, resulting in little engine retardation. Accordingly, the gear counter circuit 113 is provided a signal (BS) when the vehicle brakes are applied. At this time downshifts occur as soon as the down enable (DE) signal permits. At the same time, the brake signal (BS) will typically raise the down enable setting to a higher than normal speed. This permits most effective engine compression braking to occur naturally.

For some applications it is desirable to provide a kickdown action similar to that provided on some passenger car transmissions. Typically, this would consist of a detented switch actuated at the limit of throttle pedal travel. When the throttle is depressed to the limiting condition, a ride-through-detent (RTD) signal is generated by the ride-through-detent switch 35.

Under ride-through-detent conditions both the down enable (DE) and upshift limit (UL) speeds will be increased. This provision permits additional control of gear selection which is particularly advantageous on grades. With the normal upshift limit settings, an upshift will result in lower engine horsepower availability at the lower engine speed. Thus, on grades, for example, it would be possible for upshifts to result in insufficient power to maintain vehicle speed. This problem is further aggravated by the fact that under these conditions vehicle speed may drop significantly during the shift.

By raising the upshift limit (UL) under ride-through-detent conditions, this problem can be overcome. Typically, the upshift limit (UL) setting can be moved to region of governor droop such that there will always be increased horsepower or torque available after the upshift. Normally, this involves consideration of vehicle deceleration during the shift.

Increasing the down enable (DE) setting allows the driver to force early downshifts. This is advantageous when the driver anticipates a grade on which a downshift will be required. The early downshift will result in a minimum reduction of vehicle speed. The ride-through detent provision can also be utilized to provide added acceleration for situations such as passing another vehicle.

As was the case with the throttle modulated shift profiles, location and movement of the limiting shift points may be adjusted to fulfill other goals. For example, to improve fuel economy, the upshift limit (UL) for the next to top gear may be set somewhat lower than for other gears and additionally may not be moved by the RTD or last down (LD) signals. The result limits the maximum engine speed when the vehicle is operating at high road speeds.

Other modifications of the shift points may be desirable for special circumstances. It has been observed that with some vehicle configurations, a much smoother ride can be obtained if upshifts do not occur while the vehicle is rapidly accelerating. This can be realized by prohibiting upshifts while the rate of change of output shaft exceeds preset levels.

It has also been found convenient to establish a minimum calculated engine speed below which a downshift is mandated. This can be in part achieved by suitably shaping the throttle modulated shift point characteristic. The movement of this profile by vehicle acceleration and other factors could lead to situations in which an engine stall condition was approached. To avoid this possibility, an underspeed signal is generated whenever the calculated engine speed (COS) falls below a preset level. This underspeed signal forces a downshift (AD) request.

It will be apparent to those skilled in the art that various modifications may be made to the preferred embodiment described above without departing from the spirit and scope of the following claims.

SIGNAL GLOSSARY

The following glossary includes the analog and digital signals supplied to, acted upon or generated by the central processing unit 24 of the mechanical automatic transmission 10. This glossary, arranged alphabetically by signal code, includes a brief description of each signal and in the case of digital signals further includes explanation regarding the state of the signal (high or low) when the particular condition is true or not true. The glossary will be especially helpful when used in connection with the signal generation and function guide, FIG. 4.

| LOGIC SIGNAL | ABBREVIATION | DESCRIPTION |
| --- | --- | --- |
| Alarm | ALARM | Signal generated by the Gear Counter Circuit 113 which operates on audible alarm 27 to warn driver of an improper action. When ALARM = 1, the audible alarm is on. |
| Auto-down | AD | Downshift request generated by Shift Initiate Circuit 115 based on throttle modulated speed profile. AD = 1 when shift requested. |
| Automatic | AUTO | Signal from Driver Shift Control 26 indicating the driver has selected the Automatic mode. When AUTO = 1, shifts are initiated automatically based on the logic rules and/or requests by the Shift Initiate Circuit 115. |
| Auto-up | AU | Upshift request generated by Shift Initiate Circuit 115 based on throttle modulated speed profile. AU = 1 when shift requested. |
| Brake On | BS | Signal obtained from the brake switch 38 on the vehicle. It is used to modify the downshift speeds in the automatic mode. BS = 1 when brakes are on. |
| Calculated Engine Speed | GOS | A direct current analog signal equal to the speed of the output shaft scaled by the |

| LOGIC SIGNAL | ABBREVIATION | DESCRIPTION |
|---|---|---|
| | | numeric value of the ratio. |
| Clock Enable | CLE | Enables counter, used to generate gear codes, to respond to a clocking pulse. This signal is generated by and used in the Gear Counter Circuits. |
| Clock Pulse | CP | Signal generated by clock pulse oscillator when the Count Enable signal is true. Under these conditions the clock pulse oscillator will supply clock pulses at fixed rate, typically 100 pps. |
| Clutch Disengage | CD | Signal used to command clutch disengagement. This signal operates the exhaust valve 52 associated with the clutch 12. |
| Clutch Engagement | MODE A, MODE B, MODE C, MODE D | Modes of clutch engagement. These logic signals are generated by the Clutch Control Circuit 116 and are used to switch various analog inputs to the clutch error amplifier. |
| Clutch Inhibit | INHIBIT | Logic signal generated by Clutch Control Circuit 116 which disables the normal analog inputs to the clutch error amplifier. |
| Down Enable | DE | Signal generated by Shift Initiate Circuit 115 when the output shaft speed is sufficiently low to permit a downshift to the next lower gear without resulting in excessive engine speed. The DE signal is utilized in both the Automatic and Manual modes. |
| Downshift | DN | Implied signal in the Gear Counter Circuit 113 expressing the conditions in which a down count will be made. It is defined as an aid in determining the conditions necessary for a Count Enable signal to be generated. |
| Engine High | EH | Signal derived in the Speed and Synchronizer Circuit 112 from a comparison of the calculated engine speed (GOS) with the actual engine speed (ES). EH = 1 when the actual engine speed is greater than the calculated engine speed. |
| Engine Low | EL | Signal derived in the Speed and Synchronizer Circuit 112 from a comparison of calculated engine speed (GOS) with the actual engine speed (ES). EL = 1 when the actual engine speed is less than the calculated engine speed. |
| Engine Speed | ES | A direct current analog signal proportional to the speed of the engine 13. |
| Error | E | Signal generated in the Speed and Synchronizer Circuit 112 which is based on a comparison of the output shaft speed divided by the gear ratio for the selected gear. If the absolute value of this signal exceeds preset limits, E = 1. |
| Fault Condition | HOLD | Signal generated by logic to indicate a real or potential fault condition. No Hold circuitry has been included. Typical conditions |

-continued

| LOGIC SIGNAL | ABBREVIATION | DESCRIPTION |
|---|---|---|
| | | for generating a HOLD signal would include loss of truck air pressure, low battery voltage, speed pick up failure. |
| Fuel Valve | FV | Signal used to control flow of fuel to the engine 13. When FV = 1, fuel is supplied. |
| Gear Count | GCN | This refers to the four bit code developed by the Gear Counter Circuit 113 to specify the selected gear. |
| Gear Count Old | GCO | This refers to the four bits on the output of the latch 401 in the Command Logic Circuit 114 which holds the existing binary coded Gear Count information until a physical shift to a new gear is acceptable. |
| Gear Select Drive | M1<br>M2<br>M3<br>M4<br>M5<br>M6<br>MN<br>MR<br>O | Signals used to drive the solenoid valves 69 which accomplish gear selection. When M(N) is true, the valves will physically place the transmission in gear (N). The value of M(1, 2, 3, 4, 5, 6, N or R) is specified by GCN |
| High Pressure | HP | Signal generated by the pressure switch 54 sensing clutch air pressure. The switch 54 operates when clutch air pressure exceeds the switch setting. HP = 1 when clutch engaged to set point. |
| Ignition | IGN | Signal derived from vehicle ignition switch 25 indicating that the ignition switch is on. IGN = 1 when the ignition switch is on. |
| Low Pressure | LP | Signal generated by the pressure switch 53 sensing clutch air pressure. An LP = 1 signal indicates that clutch air pressure is below the threshold for engagement. LP = 1 when clutch disengaged. |
| Manual | MAN | Switch signal from Drive Shift Control 26 indicating that the selector lever is in the manual position. MAN = 1 when selector switch is in the manual position. |
| Manual Down | MDN | Switch signal from Driver Shift Control 26 indicating the selector switch lever is in the manual downshift request position. |
| Manual Up | MUP | Switch signal from Driver Shift Control 26 indicating the selector lever is in the manual upshift request position. |
| Neutral | NEUT | Signal from Driver Shift Control 26 indicating that the selector lever is in the neutral position. |
| One | ONE | Signal generated by Gear Counter Circuit 113 to insure that the gear counter will change only one count each time the selector switch is moved to the MUP or MDN positions. |
| Output Shaft Speed | OS | A direct current analog signal proportional to the speed of the output shaft 14. |
| Overspeed | O | Signal generated in the Speed and Synchronizer Circuit 112 indicating that the engine 13 could be overspeeded if a |

-continued

| LOGIC SIGNAL | ABBREVIATION | DESCRIPTION |
|---|---|---|
| | | shift were completed in the selected gear. This signal is based on a comparison of the calculated engine speed (GOS) with a fixed reference. |
| Reset | RESET | Signal generated by Gear Counter Circuit 113 and used to reset the gear count to the "0" state (neutral selection). The reset signal overrides all others and forces the gear counter to "0" independant of all other signals. |
| Reverse | REV | Signal from Driver Shift Control 26 indicating that the selector lever is in the reverse position. |
| Ride-Through-Detent Switch | RTD | Detented switch 35 physically associated with the throttle pedal 31. The switch 35 operates with a strong detent action when the throttle pedal is depressed to the limit of its full throttle travel. RTD = 1 at greater than full throttle pedal travel. |
| Select First Gear, etc. | S1, S2, S3, S4, S5, S6, SR, SN | Shorthand notation for gear selection indicated by gear counter binary code. S1 means the gear counter binary code corresponds to first gear, etc. SN means the gear counter binary code indicates a neutral selection. SR means the gear counter binary code indicates a reverse gear selection. |
| Shift Down | SDN | Signal generated and used by the Gear Counter Circuit 113 when a downshift has been requested from any of the possible sources. |
| Shift Up | SUP | Signal generated and used by the Gear Counter Circuit 113 when an upshift has been requested from any of the possible sources. |
| Sync Enable | SE | A signal generated by the Command Logic Circuit 114 when preconditions exist for operating the synchronizer clutch or brake. When SE = 1, synchronizing can take place. |
| Throttle Position | TP | An analog resistance signal proportional to the position of the throttle pedal 31. |
| Throttle Switch | TS | Signal generated by the switch 34 associated with the throttle pedal 31. This switch actuates with slight pressure on the throttle pedal 31 and is used to indicate to the logic that the driver's foot is on the throttle. TS = 1 when foot is on throttle. |
| Transmission Neutral | GN | Signal derived from neutral switch 73 on the transmission 11 operated when any shift rail is moved from the neutral position. GN = 1 when transmission is mechanically in neutral. (Note: GN = 0 does not mean the transmission is actually in gear.) |
| Vehicle Underspeed | U | Signal generated by Speed and Synchronizer Circuit 112 when the speed of the output shaft 14 falls below a predetermined set point, typically 60 to 70 R.P.M. U = 1 if output shaft speed is less than approximately |

-continued

| LOGIC SIGNAL | ABBREVIATION | DESCRIPTION |
|---|---|---|
| Upshift | UP | 70 R.P.M. Signal generated by the Gear Counter Circuit 113 and used to control the gear counter when an up count is to be made. |
| Upshift Limit | UL | Signal generated by Shift Initiate Circuit 115 indicating the engine speed exceeds a variable limit. The signal is generated by comparison of calculated engine speed (GOS) to the limit. |

LOGIC RULES

Gear Counter Circuit (113)

UP
$\quad$ MUP · ONE · $\overline{U}$ · $\overline{S6}$ · $\overline{HOLD}$ +

$\quad$ AUTO · TS · U · $\overline{S6}$ · $\overline{HOLD}$ +

$\quad$ MUP · ONE · $\overline{TS}$ · SN · U · $\overline{HOLD}$ +

$\quad$ AUTO · TS · S0 · U · $\overline{HOLD}$

DN
$\quad$ MDN · ONE · $\overline{S1}$ · $\overline{SN}$ · SDN · $\overline{HOLD}$ +

$\quad$ AUTO · TS · SDN · $\overline{S1}$ · $\overline{S0}$ · $\overline{HOLD}$ +

$\quad$ AUTO · SDN · (S4 + S5 + S6) · $\overline{HOLD}$ +

$\quad$ AUTO · U · (S4 + S5 + S6) · $\overline{HOLD}$ +

$\quad$ U3 · $\overline{S1}$ · $\overline{SN}$ · $\overline{HOLD}$

Clock Enable = UP + DN
RESET
$\quad$ REV · U · IGN · $\overline{HOLD}$ +

$\quad$ CO3 · $\overline{U}$ +

$\quad$ GN · U · HOLD +

$\quad$ $\overline{IGN}$ · U +

$\quad$ $\overline{AUTO}$ + $\overline{MUP}$ · SN · U +

$\quad$ NEUT · U +

CO3
$\quad$ REV · $\overline{TS}$ · U · IGN · $\overline{HOLD}$ +

$\quad$ CO3 · $\overline{U}$ +

$\quad$ REV · CO3 · IGN

Alarm
$\quad$ REV · $\overline{CO3}$ +

$\quad$ MDN · ONE · $\overline{SDN}$ +

$\quad$ $\overline{IGN}$ · U · $\overline{NEUT}$ · GN +

$\quad$ NEUT · $\overline{U}$ · $\overline{GN}$

SND
$\quad$ DE · $\overline{O}$ · (AD + $\overline{AUTO}$ + BRAKE + RTD)

SUP
$\quad$ AU — $\overline{RTD}$ + UL

Command Logic Circuit (114)

S
$\quad$ set: (GCN ≠ GCO) + E $\quad$ reset: $\overline{E}$ · SE

-continued

| LOGIC SIGNAL | ABBREVIATION | DESCRIPTION |
|---|---|---|
| M(N) | $GCO(N) \cdot \overline{S}$ | |
| SE = S · GN · LP | | |
| CD = S + $(\overline{E} \cdot SE)_D \cdot \overline{U} \cdot U \cdot \overline{TS}$ | | |
| FU = FUL · IGN | | |
| TD | set: S · $\overline{U}$ · EH | |
| | reset: U + $\overline{EH}$ | |

The embodiments of the invention in which an exclusive property or privilege is claimed are defined as follows:

1. An electro-mechanical automatic transmission system for vehicles having a throttle-controlled engine, a drive shaft operably connected to ground engaging drive wheels, a mechanical transmission having a plurality of forward and reverse gear ratio combinations selectively engageable between a transmission input shaft and a transmission output shaft, said transmission output shaft connected to said drive shaft, a clutch operably connected between said engine and said transmission input shaft, and a transmission synchronizer assembly effective to synchronize the speed of transmission elements rotating with said input shaft to transmission elements rotating with said output shaft prior to engagement therewith, said automatic transmission system comprising an electronic information processing unit having means for receiving and generating a plurality of input and output signals from a plurality of input and output signals generating and receiving means, respectively, said input signal means including (1) means interconnected with the engine throttling control effective to supply an electric input signal indicating the position of said throttling control, (2) means interconnected with said engine effective to supply an electric input signal indicating the speed of said engine, (3) means interconnected with said transmission input shaft effective to supply an electric input signal indicating the speed of said input shaft, (4) means effective to supply an electric signal indicating the speed of said vehicle and (5) means interconnected with said transmission effective to indicate when said transmission is in neutral; said output signal receiving means including means for receiving (a) an electric signal effective to engage and disengage said clutch, (b) an electric signal effective to actuate said synchronizer and (c) an electric signal effective to actuate said mechanical transmission to effect engagement of one of said gear combinations, said processing unit including a memory means for storage of data indicating the direction of the previous shift, means for processing said stored data and said input signals in accordance with a program to provide a predetermined gear ratio for a given combination of current and stored input signals and for generating the output signals to cause said output signal receiving means to operate said mechanical transmission in accordance with said program.

2. The electro-mechanical automatic transmission system of claim 1, wherein said means interconnected with the engine throttling control includes means for providing a signal which varies in proportion to the position of said throttling control, means for providing a signal indicating the presence of an operator's foot on a throttle pedal and means for providing a signal indicating that the throttle pedal is fully depressed.

3. The electro-mechanical automatic transmission system of claim 2, wherein said processing unit includes means for receiving said signal which varies in proportion to the throttling control position and for differentiating said signal, and wherein said processing unit includes means responsive to such differentiated signal for modifying the point at which said mechanical transmission is shifted from one predetermined gear ratio to another predetermined gear ratio.

4. The electro-mechanical automatic transmission system of claim 2, wherein said processing unit includes means for raising the engine speed at which upshifts and downshifts are commanded when said means for providing a signal indicating that the throttle pedal is fully depressed is activated.

5. The electro-mechanical automatic transmission system of claim 1, wherein said memory means processing unit includes means clearing said data indicating the direction of the previous shift.

6. The electro-mechanical automatic transmission system of claim 1, wherein said processing unit includes means for lowering the engine speed at which a downshift will occur in proportion to the acceleration of the vehicle, means for raising the engine speed at which a downshift will occur in proportion to deceleration of the vehicle, and means for raising the engine speed at which an upshift will occur in proportion to the deceleration of the vehicle.

7. The electro-mechanical automatic transmission system of claim 1, wherein said processing unit includes means for electrically modifying said program by raising and lowering the engine speed at which a shift will be commanded in proportion to the rate of change of vehicle speed.

8. The electro-mechanical automatic transmission system of claim 1, wherein said electronic information processing unit includes means for comparing said electric input signal indicating the speed of said transmission input shaft with said electric input signal indicating the speed of said transmission output shaft and means responsive to such comparison for determining the one of said plurality of forward and reverse gear ratio combinations engaged in said transmission.

9. The electro-mechanical automatic transmission system of claim 1, wherein said electronic information processing unit includes means for generating distinct logic codes representing each of said plurality of forward and reverse gear ratio combinations in said transmission.

10. The electro-mechanical automatic transmission system of claim 17, further including operator means responsive to said electric signal effective to actuate said transmission for effecting the engagement of one of said gear combinations, wherein said counting means includes clock means for producing timing pulses which activate said counting means, said clock means having a clock frequency sufficiently high to cycle said counting means through said distinct binary logic codes representing each transmission gear prior to movement of said operator means.

11. A transmission control system for controlling a transmission of a motor vehicle having an engine, throttle means for controlling the speed of said engine and a clutch operably connected between said engine and said transmission; said transmission including an input shaft, an output shaft, a plurality of elements which are selectively engageable to provide different gear ratio combinations between said input shaft and said output shaft, a synchronizer brake assembly operably connected to some of said transmission elements, and a synchronizer accelerator assembly operably connected to some of said transmission elements; said transmission control system including a plurality of means for providing input signals, memory means for storage of data indicating the direction of the previous shift, means for processing said stored data and said input signals in accordance with a program to select a predetermined gear ratio and to generate a plurality of output signals for a given combination of current and stored input signals, and means responsive to said output signals for shifting said transmission to such predetermined gear ratio; said input signal providing means including (1) means connected to said throttle controlling means for providing an input signal indicating the position of said throttle controlling means, (2) means for providing an input signal indicating the speed of said engine, (3) means for providing an input signal indicating the speed of said transmission input shaft, (4) means for providing an input signal indicating the speed of said motor vehicle; said output signal responsive means including (a) means for cutting off fuel to said engine regardless of the position of said throttle controlling means, (b) means for engaging and disengaging said clutch, (c) means for actuating said synchronizer brake assembly, (d) means for actuating said synchronizer accelerator assembly and (e) means for actuating said transmission to effect engagement of one of said gear combinations.

12. The transmission control system of claim 11, wherein said processing means includes means for temporarily modifying said program only during a time interval following the selection of a new gear ratio to increase the engine speed at which said processing means generates an output signal to cause said means for actuating said transmission to effect an upshift and to decrease the engine speed at which said processing means generates an output signal to cause said means for actuating said transmission to effect a downshift.

13. The transmission control system of claim 11, wherein said means for processing said stored data and said input signals includes means for differentiating the signal from said means for providing a signal which varies in proportion to the position of said throttle controlling means.

14. The transmission control system of claim 13, wherein said processing means includes means responsive to the differentiated throttle position signal for modifying said program.

15. The transmission control system of claim 11, wherein said memory means includes means for clearing data indicative of the direction of the last shift.

16. The transmission control system of claim 11, wherein said processing means includes means for lowering the engine speed at which a downshift will occur in proportion to the acceleration of the vehicle, means for raising the engine speed at which a downshift will occur in proportion to deceleration of the vehicle, and means for raising the engine speed at which an upshift will occur in proportion to the deceleration of the vehicle.

17. The transmission control system of claim 11, wherein said processing means includes means for modifying said program by increasing and decreasing the engine speed at which said processing means generates an output signal to said means for actuating said transmission in proportion to the rate of change of vehicle speed.

18. The transmission control system of claim 11, wherein said means for engaging and disengaging said clutch comprise a pneumatic operator and a plurality of solenoid valve means for filling and exhausting said pneumatic operator with a fluid.

19. The transmission control system of claim 18, wherein said plurality of solenoid valve means include orifice means for controlling the rate of flow of fluid into and out of said pneumatic operator and wherein said processing means includes means for sequentially energizing said plurality of solenoide valve means.

20. The transmission control system of claim 11, wherein said processing means includes means for modifying said program by inhibiting said output signal for controlling said means for actuating said transmission when said means for providing a signal indicating the presence of the operator's foot on the throttle is not activated.

21. The transmission control system of claim 20, wherein said means for modifying said program by inhibiting said output signal for controlling said means for actuating said transmission is operable only to inhibit downshifts.

22. The transmission control system of claim 21, wherein said means for modifying said program by inhibiting said output signal controlling said means for actuating said transmission is operable only to inhibit downshifts below third gear.

23. The transmission control system of claim 11, wherein said processing means includes counting means for generating distinct codes representing each of said plurality of forward and reverse gear ratio combinations in said transmission.

24. The transmission control system of claim 11, wherein said processing means includes means for modifying said program in response to a signal from said means for providing an input signal indicating that the brakes of said motor vehicle are activated.

25. A transmission system for vehicles having a throttle-controlled engine, a drive shaft operably connected to ground engaging drive wheels, a transmission having an input shaft, an output shaft operably connected to said drive shaft and a plurality of gear ratio combinations selectively engageable between said input and output shafts, and means operably connecting said input shaft to said engine, said transmission system comprising means for generating a plurality of input signals indicative of at least (1) the speed of said input shaft, (2) the speed of said vehicle and (3) the position of said engine throttling control, an electronic signal processor including memory means for storing data indicating the direction of the previous shift and means for processing said stored data and said input signals in accordance with a program to select an optimum one of said gear ratio combinations, means responsive to a change in said selected gear ratio for shifting said transmission to the newly selected gear ratio, and means responsive to a predetermined change in the position of said engine throttling control for modifying the point at which said transmission is shifted from one selected gear ratio to another selected gear ratio.

26. The transmission system of claim 25, wherein said modifying means includes means for raising the engine speed at which upshifts and downshifts to another gear ratio are commanded when said input signal indicative of the position of said engine throttling control indicates that the vehicle throttle pedal is fully depressed.

27. The transmission of claim 25, wherein said modifying means is responsive to rate of change of the input signal indicative of the position of said engine throttling control for modifying the point at which said transmission is shifted from one selected gear ratio to another gear ratio.

28. A transmission system for vehicles having a throttle controlled engine, a drive shaft operably connected to ground engaging drive wheels, a transmission having an input shaft, an output shaft operably coupled to said drive shaft and a plurality of gear ratio combinations selectively engageable between said input and output shafts, and means operably connecting said input shaft to said engine, said transmission system comprising means for generating a plurality of input signals indicative of at least (1) the speed of said input shaft, (2) the speed of said vehicle and (3) the rate of acceleration and deceleration of said vehicle, an electronic signal processor including memory means for storing data indicating the direction of the previous shift and means for processing said stored data and said input signals in accordance with a program to select an optimum one of said gear ratio combinations, means responsive to a change in said selected gear ratio for shifting said transmission to the newly selected gear ratio, and means responsive to said input signal indicative of said rate of acceleration and deceleration for modifying the point at which said transmission is shifted from one selected gear ratio to another gear ratio.

29. The transmission system of claim 28, wherein said modifying means includes means for lowering the engine speed at which a downshift to another gear ratio will occur in proportion to the accleleration of the vehicle, means for raising the engine speed which a downshift to another gear ratio will occur in proportion to deceleration of the vehicle, and means for raising the engine speed at which an upshift to another gear ratio will occur in proportion to deceleration of the vehicle.

30. The transmission system of claim 29, wherein said means for generating a plurality of input signals further generates a signal indicative of (4) the position of said engine throttling control, and further including means responsive to a predetermined change in said engine throttling control position signal for modifying the point at which said transmission is shifted from one selected gear ratio to another gear ratio.

31. The transmission system of claim 30, and wherein said modifying means responsive to a predetermined change in said engine throttling control position signal includes means for differentiating said engine throttling control position signal, and means responsive to such differentiated signal for modifying the point at which said transmission is shifted from one selected gear ratio to another gear ratio.

32. The transmission system of claim 28, wherein said means for generating a plurality of input signals further generates a signal indicative that (4) the vehicle brakes are actuated, and further including means responsive to said vehicle brake actuation signal for modifying the point at which said transmission is shifted from one selected gear ratio to another gear ratio.

33. An automatic transmission control system for controlling a transmission of a motor vehicle having a throttle controlled engine, and a clutch operably connected between said engine and said transmission; said transmission including an input shaft, an output shaft, a plurality of elements which are selectively engageable to provide different gear ratio combinations between said input shaft and said output shaft, said transmission control system including a plurality of means for providing input signals, means for processing said signals in accordance with a program to select a predetermined gear ratio and to generate a plurality of output signals for a given combination of input and processed signals, and means responsive to said output signals for shifting said transmission to a predetermined gear ratio; said input signal providing means including (1) means connected to said throttle controlling means for providing an input signal indicating the position of said throttle controlling means, (2) means for providing an input signal indicating the selected gear ratio, (3) means for providing an input signal indicating the speed of said motor vehicle, (4) means for generating an input signal indicating the speed of said engine; said output signal responsive means including (a) means for actuating said transmission to effect engagement of one of said gear combinations and (b) means for engaging and disengaging said clutch at a predetermined rate controlled by output signals from said processor.

34. An automatic transmission system for devices having a throttle-controlled engine, throttling control means and a transmission having a plurality of gear ratio combinations selectively engageable between a transmission input shaft and a transmission output shaft, said transmission input shaft being operatively connected to said engine, said transmission system comprising, an information processing unit having means for receiving a plurality of input signals and means for generating output signals, said input signals including (1) an input signal indicative of the position of said throttle controlling means and (2) an input signal indicative of the rotational speed of said engine, means associated with said transmission effective to actuate said transmission to effect engagement of one of said gear ratio combinations in response to said output signals from said processing unit, said processing unit including a memory means for storing information indicating the direction of the previous shift and means for processing said stored information and current input signals in accordance with a program to provide a predetermined gear ratio for a given combination of stored information and current input signals and for generating output signals whereby said transmission system is operated in accordance with said program.

35. The automatic transmission system of claim 34 wherein said memory means includes means to clear said stored information.

36. The automatic transmission system of claim 35 wherein said means to clear said stored information is effective to clear said stored information when said engine speed equals a specified reference value.

37. The automatic transmission system according to claim 34, wherein said processing unit includes means for modifying said predetermined program including changing the engine speed at which a shift will be commanded in a direction determined by the direction of the previous shift.

38. The automatic transmission system of claim 37, wherein said input signals additionally include (3) an input signal indicating the current engaged gear ratio and the engine speeds at which upshifts and downshifts are commanded are additionally a function of sensed current engaged gear ratio.

39. The automatic transmission system of claim 38, wherein said input signal indicating engine speed comprises an input signal indicating output shaft speed and said processing unit includes means to multiply said input signal indicating output shaft speed by a factor related to the current engaged gear ratio to determine a calculated sensed engine speed.

40. The automatic transmission system according to claim 37, wherein said memory means includes means to clear said stored information.

41. The automatic transmission system according to claim 40, wherein said means to clear stored information is effective to clear said stored information when said engine speed reaches a specified reset reference value, and wherein said processing unit comprises means to modify said program by increasing the predetermined reset reference speed if the previous shift was a downshift and by decreasing the predetermined reset reference speed if the previous shift was an upshift.

42. The automatic transmission system of claim 40, wherein said input signals additionally include (3) an input signal indicating the current engaged gear ratio and the sensed engine speeds at which upshifts and downshifts are commanded are additionally a function of sensed current engaged gear ratio.

43. The automatic transmission system of claim 42, wherein said input signal indicating engine speed comprises an input signal indicating output shaft speed and said processing unit comprises means to multiply said input signal indicating output shaft speed by a factor related to the current engaged gear ratio to determine a calculated sensed engine speed.

44. The automatic transmission system of claims 36, 37, 38, 39, or 40, wherein said processing unit comprises means for modifying said program for a predetermined time interval following the selection of a new gear ratio including lowering the sensed engine speed at which a downshift will be commanded if the previous shift was an upshift and raising the sensed engine speed at which an upshift will be commanded if the previous shift was a downshift.

45. The automatic transmission system of claim 42, wherein said processing unit comprises means for modifying said program for a predetermined time interval following the selection of a new gear ratio including lowering the sensed engine speed at which a downshift will be commanded if the previous shift was an upshift and raising the sensed engine speed at which an upshift will be commanded if the previous shift was a downshift.

46. The automatic transmission system of claim 43, wherein said processing unit comprises means for modifying said program for a predetermined time interval following the selection of a new gear ratio including lowering the sensed engine speed at which a downshift will be commanded if the previous shift was an upshift and raising the sensed engine speed at which an upshift will be commanded if the previous shift was a downshift.

47. An automatic transmission system for vehicles having a throttle-controlled engine, a throttling control means and a transmission having a plurality of gear ratio combinations selectively engageable between a transmission input shaft and a transmission output shaft, said transmission input shaft being operatively connected to said engine, said transmission system comprising an information processing unit having means for receiving a plurality of input signals and means for generating output signals, said input signals including (1) a signal indicating the position of said throttling control means and (2) a signal indicating the rotational speed of said engine, (3) a signal indicative of output shaft speed, said transmission including means responsive to said output signals effective to actuate said transmission to effect engagement of one of said gear ratio combinations, said processing unit including means differentiating with respect to time said input signal indicating output shaft speed to generate a signal representative of vehicle acceleration and deceleration, said processing unit including means for processing said input signals in accordance with a program to provide a predetermined gear ratio for a given combination of input signals and for generating output signals whereby said vehicle transmission system is operated in accordance with said program, said program setting forth a predetermined engine speed at which upshifts and downshifts are commanded for each sensed throttling control position, and wherein said processing unit includes means for modifying said program including means for modifying the engine speed at which upshifts and downshifts are commanded by lowering the engine speed at which a downshift will be commanded in proportion to the acceleration of the vehicle, raising the engine speed at which a downshift will be commanded in proportion to the deceleration of the vehicle and raising the engine speed at which an upshift will be commanded in proportion to the deceleration of the vehicle.

48. The automatic transmission system of claim 47, wherein said input signals additionally include (3) an input signal indicating the current engaged gear ratio and wherein the engine speeds set forth in said program at which upshifts and downshifts are commanded are additionally a function of sensed current engaged gear ratio.

49. The automatic transmission system of claim 48, wherein said input signal indicating engine speed comprises an input signal indicating output shaft speed and said processing unit comprises means to multiply said input signal indicating output shaft speed by a factor related to the current engaged gear ratio to determine a calculated sensed engine speed.

50. The automatic transmission system according to claims 47, 48 or 49, wherein said processing means includes means for modifying said program during a predetermined time interval following the selection of a new gear ratio to increase the engine speed at which the processing unit generates a signal to said means for actuating said transmission to effect an upshift and to decrease the engine speed at which said output signal generating means signals said means for activating said transmission to effect a downshift.

51. The automatic transmission system of claims 47, 48 or 49, wherein said processing unit includes a memory means for storing and clearing the direction of the previous shift and said means for processing said input signals processes said input signals and said stored information and inlcudes means for modifying said predetermined program including changing the engine speed at which a shift will be commanded according to the direction of the previous shift.

52. The automatic transmission system of claim 50, wherein said processing unit includes a memory means for storing and clearing the direction of the previous shift and said means for processing said input signals processes said input signals and said stored information and includes means for modifying said predetermined program including changing the engine speed at which a shift will be commanded according to the direction of the previous shift.

53. An automatic transmission system for vehicles having a throttle-controlled engine, a throttling control means and a transmission having a plurality of gear ratio combinations selectively engageable between a transmission input shaft and a transmission output shaft, said transmission input shaft operatively connected to said engine, said transmission system comprising an information processing unit having means for receiving a plurality of input signals and means for generating output signals, said input signals including (1) a signal indicating the position of said throttling control means and (2) a signal indicating the rotational speed of said engine, (3) a signal indicative output shaft speed, said transmission including means responsive to said output signals effective to actuate said transmission to effect engagement of one of said gear ratio combinations, said processing unit including means for processing said input signals in accordance with a program to provide a predetermined gear ratio for a given combination of input signals and for generating the output signals whereby said vehicle transmission system is operated in accordance with said program, said program setting forth a predetermined engine speed at which upshifts and downshifts are commanded for each sensed throttling control position, and wherein said processing unit includes means for modifying said program including means for modifying the engine speed at which upshifts and downshifts are commanded by modifying said program for a predetermined time interval following the selection of a new gear ratio.

54. The automatic transmission system of claims 34, 37, 47 or 53 wherein said input signal indicating the position of said throttling control means includes an input signal which varies in proportion to the position of said throttling control and an input signal indicating when said throttling control is at its maximum setting and wherein said processing unit includes means for modifying said predetermined program including raising the engine speed at which upshifts and downshifts are commanded when said input signal indicating said throttling control is at its maximum setting is activated.

55. The automatic transmission system of claims 34 or 37, wherein said input signals include an input signal indicating the presence of the operator's foot on the throttling control and wherein said processing unit includes means for modifying said predetermined program by raising the engine speeds at which downshifts are commanded if said means for providing a signal indicating the presence of the operator foot on the throttling control is not activated.

56. An automatic transmission system for vehicles having a throttle-controlled engine, a throttling control means and a transmission having a plurality of gear ratio combinations selectively engageable between a transmission input shaft and a transmission output shaft, said transmission input shaft operatively connected to said engine, said transmission system comprising an information processing unit having means for receiving a plurality of input signals and means for generating output signals, said input signals including (1) a signal indicating the position of said throttling control means and (2) a signal indicating the rotational speed of said engine, (3) a signal indicative of output shaft speed, said transmission including means responsive to said output signals effective to actuate said transmission to effect engagment of one of said gear ratio combinations, said processing unit including means for processing said input signals in accordance with a program to provide a predetermined gear ratio for a given combination of input signals and for generating the output signals whereby said vehicle transmission system is operated in accordance with said program, said program setting forth a predetermined engine speed at which upshifts and downshifts are commanded for each sensed throttling control position, and wherein said processing unit includes means for modifying said program including means for modifying the engine speed at which upshifts and downshifts are commanded, and wherein said input signal indicating position of said throttling control means varies in proportion to the position of the throttling control and said processing unit comprises means to differentiate said input signal indicating position of throttling control with respect to time and means responsive to all of said input signals including said differentiated throttle control position signal, for modifying the engine speed at which said transmission is shifted from one predetermined gear ratio to another predetermined gear ratio.

57. The automatic transmission system of any of claims 34, 37 or 38, wherein said input signal indicating position of said throttling control means varies in proportion to the position of the throttling control and said processing unit comprises means to differentiate said input signal indicating position of throttling control with respect to time and means responsive to such differentiated throttling central position input signal for modifying the sensed engine speed at which said transmission is shifted from one predetermined gear ratio to another predetermined gear ratio.

58. The automatic transmission system of claim 57, wherein said input signal indicating the position of said throttling control means includes an input signal indicating when said throttling control is at its maximum setting and wherein said processing unit includes means for modifying said predetermined program including raising the sensed engine speed at which upshifts and downshifts are commanded when said input signal indicating said throttling control is at its maximum setting is activated.

59. The automatic transmission system of claim 56 wherein said processing unit includes a memory means for storing and clearing the direction of the previous shift and wherein said means for modifying said program includes means changing the engine speed at which a shift will be commanded according to the direction of the previous shift.

60. The automatic transmission system of claims 36, 37, 38, 39, or 40, wherein said processing unit comprises means for modifying said program for a predetermined time interval following the selection of a new gear ratio.

61. An automatic transmission system in accordance with claim 53 wherein the means for modifying the engine speed includes lowering the sensed engine speed at which a downshift will be commanded if the previous shift was an upshift and raising the sensed engine speed at which an upshift will be commanded if the previous shift was a downshift.

62. An automatic transmission system in accordance with claim 47 wherein said input signals include an input signal indicating the presence of the operator's foot on the throttling control and wherein said processing unit includes means for modifying said predetermined program by raising the engine speeds at which downshifts are commanded if said means for providing a signal indicating the presence of the operator foot on the throttling control is not activated.

63. An automatic transmission system in accordance with claim 53 wherein said input signals include an input signal indicating the presence of the operator's foot on the throttling control and wherein said processing unit includes means for modifying said predetermined program by raising the engine speeds at which downshifts are commanded if said means for providing a signal indicating the presence of the operator foot on the throttling control is not activated.

64. An automatic transmission system in accordance with claim 47 wherein said input signal indicating position of said throttling control means varies in proportion to the position of the throttling control and said processing unit comprises means to differentiate said input signal indicating position of throttling control with respect to time and means responsive to such differentiated throttling control position input signal for modifying the sensed engine speed at which said transmission is shifted from one predetermined ratio to another predetermined gear ratio.

65. An automatic transmission system in accordance with claim 53 wherein said input signal indicating position of said throttling control means varies in proportion to the position of the throttling control and said processing unit comprises means to differentiate said input signal indicating position of throttling control with respect to time and means responsive to such differentiated throttling control position input signal for modifying the sensed engine speed at which said transmission is shifted from one predetermined ratio to another predetermined gear ratio.

* * * * *

UNITED STATES PATENT AND TRADEMARK OFFICE
CERTIFICATE OF CORRECTION

PATENT NO. : 4,361,060
DATED : November 30, 1982
INVENTOR(S) : Robert R. Smyth

It is certified that error appears in the above-identified patent and that said Letters Patent are hereby corrected as shown below:

Column 2, line 6 change "rains" to --trains--.

Column 17, line 34 change "317" to --327--.

Column 18, line 55 change "nob" to --no--.

Column 27, line 41 change "600" to --660--.

Column 44, line 63 change "17" to --9--.

Column 41, 2/3 way down page, change "AUTO + MUP=. SN .U +" to --AUTO + MUP , SN .U +--.

Signed and Sealed this

First Day of December, 1987

Attest:

DONALD J. QUIGG

Attesting Officer

Commissioner of Patents and Trademarks